United States Patent
Watanabe

(10) Patent No.: US 6,498,598 B2
(45) Date of Patent: *Dec. 24, 2002

(54) IMAGING DEVICE SYSTEM, CONTROL METHOD FOR THE SYSTEM, IMAGING DEVICE, CONTROL DEVICE, CONTROL METHOD FOR THE IMAGING DEVICE, CONTROL METHOD FOR THE CONTROL DEVICE, AND STORAGE MEDIUM

(75) Inventor: Yoshiyuki Watanabe, Kokubunji (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/356,460

(22) Filed: Jul. 19, 1999

(65) Prior Publication Data

US 2002/0101514 A1 Aug. 1, 2002

(30) Foreign Application Priority Data

Jul. 30, 1998 (JP) .......................... 10-216129

(51) Int. Cl.⁷ .......................... G09G 5/00; H04N 5/232
(52) U.S. Cl. .................. 345/156; 348/211; 345/716
(58) Field of Search ............... 348/211, 212, 348/213, 73, 153, 159, 174; 345/520

(56) References Cited

U.S. PATENT DOCUMENTS

| | | | | |
|---|---|---|---|---|
| 4,858,012 A | * | 8/1989 | Hino et al. .................. 348/213 |
| 5,039,847 A | | 8/1991 | Morii .......................... 235/379 |
| 5,068,735 A | * | 11/1991 | Tuchiya et al. ............. 348/213 |
| 5,479,206 A | * | 12/1995 | Ueno et al. .................. 348/211 |
| 5,754,227 A | | 5/1998 | Fukuoka ...................... 348/232 |
| 5,942,983 A | * | 8/1999 | Iijima et al. ........... 340/825.06 |
| 6,084,631 A | * | 7/2000 | Tonklin et al. ............. 348/212 |
| 6,100,812 A | * | 8/2000 | Tanaka et al. ......... 340/825.37 |
| 6,161,933 A | * | 12/2000 | Tschida et al. ............. 352/179 |

FOREIGN PATENT DOCUMENTS

| | | |
|---|---|---|
| EP | 0 674 435 | 9/1995 |
| EP | 0 715 453 | 6/1996 |
| EP | 0 734 157 | 9/1996 |
| EP | 0 748 132 | 12/1996 |
| EP | 0 754 994 | 1/1997 |
| JP | 5-276516 | 10/1993 |
| JP | 6-153204 | 5/1994 |
| JP | 7-193806 | 7/1995 |
| JP | 7-240871 | 9/1995 |
| JP | 8-24222 | 1/1996 |
| JP | 8-265683 | 10/1996 |
| WO | WO 94/24813 | 10/1996 |

* cited by examiner

Primary Examiner—Richard Hjerpe
Assistant Examiner—Alexander Eisen
(74) Attorney, Agent, or Firm—Fitzpatrick, Cella, Harper & Scinto

(57) ABSTRACT

A video camera system which can automatically avoid a mismatch that occurs between camera setting values on the PC side and camera setting values on the video camera side immediately after the connection therebetween. A video camera includes a controlled unit capable of being externally controlled in accordance with information inputted from a second data communication node. A control device includes a control unit for outputting the information to control the video camera from a first data communication node, a storage unit for storing at least one preset imaging device control condition, a control condition changing unit for changing the imaging device control condition stored in the storage unit, a detecting unit for detecting whether the control device and the video camera are connected, and an output unit started up in response to a detection signal from the detecting means for reading the imaging device control condition stored in the storage unit and outputting the read control conditions from the first data communication node.

15 Claims, 28 Drawing Sheets

EXCLUSIVE LOGICAL SUM SIGNAL OF DATA AND STROBE

BRANCH : NODE HAVING TWO OR MORE PORTS
CONNECTED TO OTHER NODES
LEAF     : NODE HAVING ONLY ONE PORT
CONNECTED TO ANOTHER NODE

▫ : PORT
c : PORT CORRESPONDING TO CHILD NODE
p : PORT CORRESPONDING TO PARENT NODE

REQUEST FOR RIGHT OF USING BUS

PERMISSION OF BUS USE

FIG. 23

| ADDRESS IN NODE | | |
|---|---|---|
| FFFF F000 0400 | 04 | crc_length | rom_crc_value |
| FFFF F000 0404 | "1394" | |
| FFFF F000 0408 | reserved / cmc / isc / bmc / imc | cyc_clk_acc | max_rec | reserved |
| FFFF F000 040C | node_vendor_id — 2301 | chip_id_hi — 2303 |
| FFFF F000 0410 | chip_id_lo — 2302 | |
| ----- | | |

FIG. 28

| PC COMMANDS | MEANING OF COMMANDS |
|---|---|
| AE MODE | SELECT PROGRAM AE MODE |
| DIGITAL ZOOM | SET MAX. MAGNIFICATION OF ELECTRONIC ZOOM, PERMIT/PROHIBIT ELECTRONIC ZOOM |
| ZOOMING POSITION | SET ZOOMING POSITION |
| ZOOM | SET DIRECTION AND SPEED OF ZOOM DRIVING |
| FOCUS | SET DIRECTION AND SPEED OF FOCUS DRIVING |
| FOCUSSING MODE | SELECT AUTO/MANUAL FOCUSSING |
| FOCUSSING POSITION | SET FOCUSSING POSITION |
| GAMMA | SET GAMMA CHARACTERISTIC FOR EACH OF Y/R/G/B |
| GAIN | SET AGC GAIN |
| IMAGE STABILIZER | SET RESISTANCE AGAINST VIBRATION, SELECT ON/OFF |
| IRIS | SET AUTO/MANUAL MODE FOR EXPOSURE CORRECTION, SET F-STOP NUMBER |
| SETUP LEVEL | SET SETUP LEVEL FOR EACH OF Y/R/G/B |
| SHUTTER | SET SHUTTER SPEED |
| WHITE BALANCE | SELECT AUTO/SET/PRESET MODE FOR WHITE BALANCE |
| AE SHIFT | SHIFT APERTURE SIZE |
| AE LOCK | SELECT AUTO/LOCK MODE FOR EXPOSURE CORRECTION |
| COLOR GAIN | ADJUST COLOR GAIN |
| TINT (HUE) | ADJUST TINT |
| ⋮ | ⋮ |

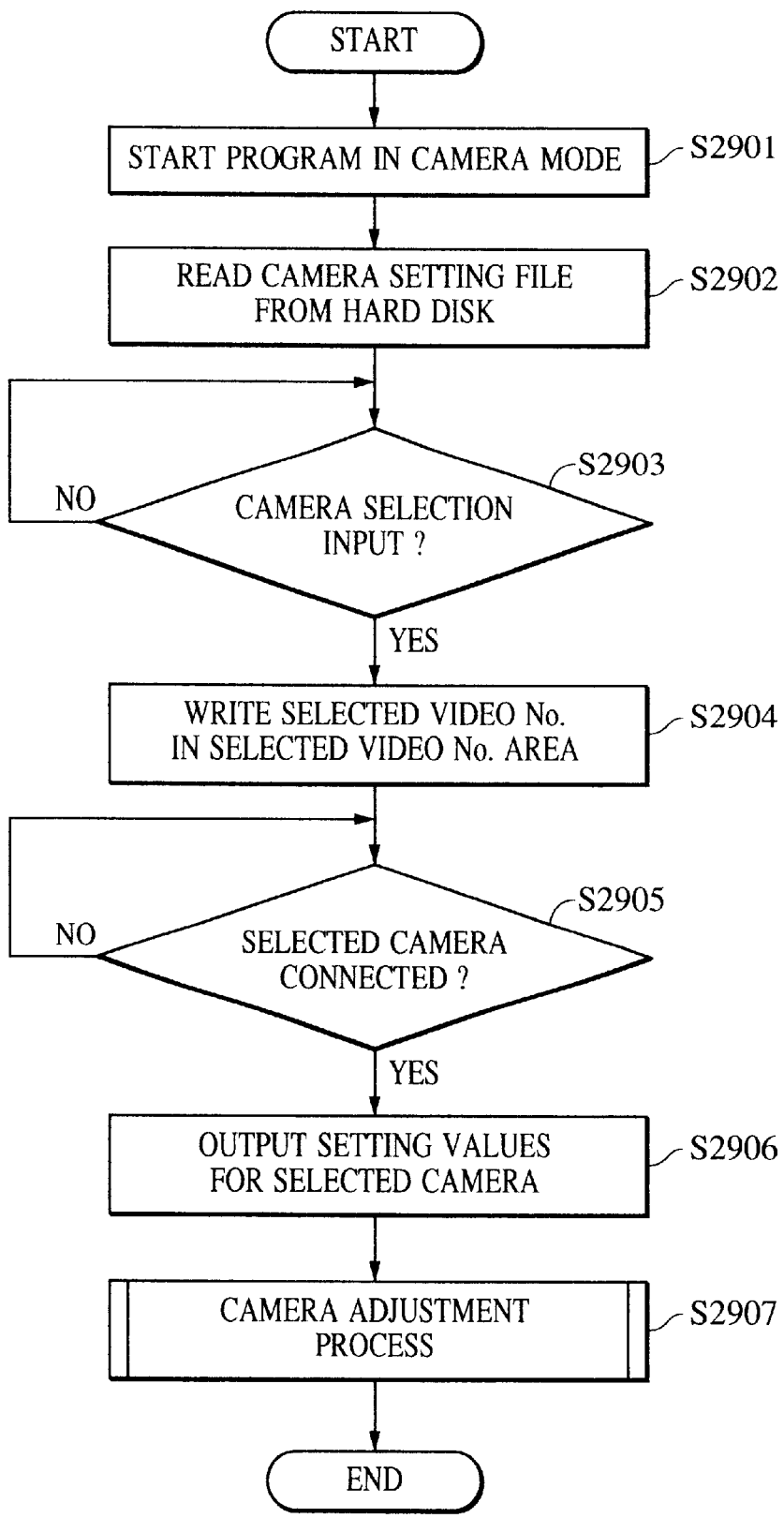

IMAGING DEVICE SYSTEM, CONTROL METHOD FOR THE SYSTEM, IMAGING DEVICE, CONTROL DEVICE, CONTROL METHOD FOR THE IMAGING DEVICE, CONTROL METHOD FOR THE CONTROL DEVICE, AND STORAGE MEDIUM

BACKGROUND OF THE INVENTION

1. Field of the Invention

The present invention relates to apparatus and method for outputting a command from outside of a device to change a control method of the device to execute an operation different from that actuated by remote control executed by the device's control unit.

2. Description of the Related Art

Hitherto, peripheral devices of a personal computer (referred to as a PC hereinafter), such as a hard disk and a printer, have been connected to the PC through a universal interface for small computers, e.g., a digital interface (referred to as a digital I/F) such as a SCSI, for data communication.

Digital cameras and digital video cameras are also regarded as input means to a PC and are also peripheral devices. Recently, the technology of transferring images (such as still and motion pictures picked up by digital cameras and video cameras) into a PC along with accompanying voice signals, storing the pictures in a hard disk or editing them in the PC, and then color-printing the pictures using a printer has been developed and has gained popularity.

When such image data is outputted from the PC to the printer or to the hard disk, the data is communicated via the above-mentioned SCSI or the like. On that occasion, a versatile digital I/F having a high transfer data rate, such as the SCSI, is required for sending a large amount of data.

However, such conventional digital I/Fs are still inconvenient in many points because some of them have a low data transfer rate, or employ large-diameter cables for parallel communication, or have limitations in type and connecting scheme, or require I/F connectors in the same number as destinations to be connected.

Furthermore, in many of the general PCs and digital equipment for use at home, a connector for connection to a SCSI cable is provided on the back side of the PC. Such a connector has a relatively large size, and it is rather troublesome to couple the cable to the connector.

When connecting, to PCs, portable equipment (such as digital cameras and video cameras) must be connected to connectors on the PC back side at every use, which is very troublesome for users.

Digital data communication has been used for mutual communication between a PC and such peripheral devices, and has utilized conventional communication techniques. It is however expected in the future that the types of devices using digital data will increase, and an improvement of I/Fs can improve network communication among many interconnected digital devices including PC peripheral devices to include digital video cameras, digital storage medium playback apparatuses, etc. If so, such network communication will be very convenient for users. On the other hand, since such communication will often transfer an extremely large amount of data, the use of conventional communication techniques will make the network crowded and adversely affect the communication between other devices in the network.

In view of the above, a method has been proposed to overcome the problems encountered in the conventional digital I/Fs, and to employ a universal digital I/F (e.g., IEEE 1394-1995 High Performance Serial Bus) equipped on each piece of digital equipment in conformity with a unified standard for communication between all the types of digital equipment including PCs and peripheral devices thereof. Thus, the proposed method intends to realize data communication among devices when a PC, a printer and other peripheral devices, a digital camera, a digital VTR, a camcoder, etc. are connected to each other in the form of a network.

The IEEE 1394 I/F has several remarkable advantages. Because of high-speed serial communication, though described later in detail, a cable is relatively thin and highly flexible, and the connector size is much smaller than the case of using a SCSI cable. Further, a large amount of data such as image information can be transferred at a high speed along with device control data. In other words, communication using the IEEE 1394 I/F is greatly advantageous in that when connecting portable equipment (such as digital cameras and video cameras), the connection work is much less troublesome for users, and image information can be more easily transferred to PCs.

The IEEE 1394 serial bus will be described below in more detail.

(Technical Outline of IEEE 1394)

With the advent of home digital VTRs and DVD players, it has been required to support data transfers of large amounts of information (such as video data and audio data) in real time. In order to transfer such data in real time, and to input such data into a PC or transfer them to another piece of digital equipment, an interface is needed which has a required transfer function and is able to transfer data at a high speed. The IEEE 1394-1995 (High Performance Serial Bus) (referred to as the 1394 serial bus hereinafter) is an interface that has been developed from the above point of view.

FIG. 7 shows an example of a network system made up by using 1394 serial buses. The network system includes devices A, B, C, D, E, F, G and H. Twisted pair cables constituting 1394 serial buses are employed to interconnect between A and B, between A and C, between B and D, between D and E, between C and F, between C and G, between C and H. The devices A to H comprise, e.g., a PC, a digital VTR, a DVD player, a digital camera, a hard disk, a monitor, etc.

The devices can be interconnected in a mixed fashion of a daisy chain system and a node branch system with a high degree of flexibility.

Also, each device has its own specific ID, and recognizes the IDs of the other devices which constitute a network devices interconnected by the 1394 serial buses. Thus, just by connecting two pieces of digital equipment successively with one 1394 serial bus, one network is constructed by devices each of which has a relay function. The entire network has the feature of the 1394 serial buses, i.e., a function of automatically recognizing network devices, their connection status, etc. based on the plug and play function at the time when the bus cables are connected to the devices.

Further, when some device is removed from or newly added to the network as shown in FIG. 7, the bus reset is automatically made to reset the network configuration, and a new network is formed. This function makes it possible to always set and recognize the network configuration from time to time.

The 1394 serial buses allow data transfer rates of 100/200/400 Mbps. Devices having higher data transfer rates support the lower data transfer rates for compatibility between the devices.

As data transfer modes, there are an asynchronous transfer mode for transferring asynchronous data (referred to as Asynch data hereinafter) such as a control signal, and an isochronous transfer mode for transferring isochronous data (referred to as Iso data hereinafter) such as real-time video data and audio data. The Asynch data and the Iso data are transmitted in a mixed fashion within each cycle (being usually 125 µs) with a higher priority given to the Iso data, following transfer of a cycle start packet (CSP) which indicates the start of the cycle.

FIG. 8 shows constituent elements of the 1394 serial bus.

The 1394 serial bus is of a layered structure in its entirety. As shown in FIG. 8, the core of hardware components is a 1394 serial bus cable. A connector of the cable is connected to a connector port, and a physical layer and a link layer exist as other hardware components at a level higher than the connector port.

Those two hardware components essentially constitute an interface chip. The physical layer executes coding, control related to the connector, etc, and the link layer executes packet transfer, control of cycle time, etc.

A transaction layer (as one of the firmware components) manages data to be subjected to transfer (transaction), and issues commands such as Read and Write. A serial bus management (as the other firmware component) manages connection status of the devices connected to the bus, IDs, and the network configuration.

The above-described hardware and firmware components essentially construct the 1394 serial bus.

An application layer (as a software component) varies depending on the software used. The application layer specifies a manner of placing data on the interface, and is specified by a protocol such as an AV protocol.

The 1394 serial bus is constructed as described above.

Next, FIG. 9 shows an address space in the 1394 serial bus.

The devices (nodes) connected to the 1394 serial bus are each given with its own specific 64-bit address, without exceptions. The node addresses are stored in a ROM so that each device can always recognize its own and other addresses, and can perform communication with a partner designated.

Addressing of the 1394 serial bus conforms with the IEEE 1212 standards. Specifically, the node address is set as follows. The first 10 bits are used for designating the bus number, and the next 6 bits are used for designating the node ID number. The remaining 48 bits represent an address width allocated to the device, and can be used as a specific address space. The last 28 bits represent a specific data area in which information necessary for identifying the device and designating service conditions thereof are stored.

The technical outline of the IEEE 1394 serial bus has been described above.

The technical features of the IEEE 1394 serial bus will now be described in more detail.

(Electrical Specifications of IEEE 1394 Serial Bus)

FIG. 10 shows a section of the 1394 serial bus cable.

In the connecting cable of the 1394 serial bus, power lines can be disposed in addition to two sets of twisted signal line pairs. With the provision of the power liens, power can be supplied to, e.g., a device having no power supply, or to a device having a voltage lowered due to a failure.

Alternatively, a simplified connecting cable may exclude power lines under conditions which restrict devices to which the cable may be connected.

Power supplied through the power lines is specified to have a voltage of 8 to 40 V and a maximum DC current of 1.5 A.

(DS-Link Coding)

FIG. 11 is a chart for explaining a DS-Link coding method of a data transfer format employed for the 1394 serial bus.

The 1394 serial bus employs a DS-Link (Data/Strobe-Link coding method. The DS-Link coding method is suitable for high-speed serial data communication, and requires two signal lines. Of a pair of twisted lines, one line serves to transmit primary data, and the other line serves to transmit a strobe signal.

On the receiving side, a clock can be reproduced by taking the exclusive logical sum of data and strobe.

The merits of employing the DS-Link coding method are described below. Transfer efficiency is higher than other serial data transfer methods. No need of a PLL circuit reduces the circuit scale of a controller LSI. When there is no data to be transferred, it is not required to transmit information indicating an idle state. Accordingly, a transceiver circuit of each device can be brought into a sleep state, and power consumption can be reduced.

(Bus Reset Sequence)

In the 1394 serial bus, the devices (nodes) connected to the bus are each given a specific node ID, and recognized as one of the nodes of a network configuration.

When it is required to recognize a new network configuration upon a change of the network configuration, e.g., upon the number of nodes being increased or reduced due to insertion or removal of a node or a power-on/off in the node, each node having detected such a change transmits a bus reset signal on the bus, and goes into a mode for recognizing a new network configuration. At this time, such a change is detected by sensing a change of the bias voltage on a 1394 port board.

At soon as one node transmits a bus reset signal and the physical layer of another node receives the bus reset signal, the occurrence of a bus reset is indicated from the physical layer to the link layer, and the bus reset signal is further transmitted to still another node. After all the nodes have finally received the bus reset signal, the bus reset is started up.

The bus reset is started up when a hardware change, such as insertion or removal of the cable or an abnormal condition of the network, is detected as described above, or when a command is directly issued to the physical layer under host control in accordance with the protocol.

Also, data transfer is temporarily suspended upon the start-up of the bus reset, and is held in a standby state during the suspension. After the suspension, data transfer is restarted under a new network configuration.

The bus reset sequence has been described above.

(Node ID Determining Sequence)

After the bus reset, the nodes start the operation for allocating IDs to themselves to construct a new network configuration. A general sequence from the bus reset to the determination of node IDs will be described below with reference to flowcharts of FIGS. 19, 20 and 21.

The flowchart of FIG. 19 shows a sequence of steps executed on the bus from the bus reset until the node IDs are determined to permit start of data transfer.

First, in step S101, it is always monitored whether a bus reset occurs in the network. If the bus reset occurs due to, e.g., power-on/off in the node, the processing goes to step S102.

In step S102, parent-child relation is declared between nodes, which are directly connected to each other, for determining the connection status of a new network from the reset state of the network. If parent-child relations are decided between all the nodes in step S103, one root is decided in step S104. Until parent-child relations are decided between all the nodes, the declaration of parent-child relation in step S102 is repeated and the root is not decided.

If the root is decided in step S104, the processing goes to step S105 in which the node ID setting operation is carried out to allocate IDs to the nodes. The node ID setting operation is repeated to set the node IDs in a predetermined node sequence until all the nodes are given their own IDs. If all the nodes are completely given the IDs in step S106, this means that the new network configuration has been recognized by all of the nodes. In step S107, therefore, the bus comes into a state capable of performing data transfer between the nodes, and the data transfer is started.

Subsequent to the state of step S107, the bus is brought again into the mode of monitoring the occurrence of the bus reset in the network. If the bus reset occurs, the node ID setting operation from step S101 to step S106 is repeated.

The flowchart of FIG. 19 has been described above. FIGS. 20 and 21 are flowcharts showing in more detail a process from the bus reset to the determination of the root and a process from the determination of the root to the end of the ID setting, respectively, in the flowchart of FIG. 19.

The flowchart of FIG. 20 will be first described.

If the bus reset occurs in step S201, the network configuration is once reset.

It is always monitored in step S201 whether a bus reset occurs in the network.

Then, in step S202, a flag indicating that the device is a leaf (node) is set in each such device as a first step of the operation for recognizing the connection status of the reset network. Thereafter, in step S203, it is checked how many ports provided in each device itself are connected to other nodes.

The number of ports not yet defined (i.e., for which a parent-child relation is not yet decided) is checked in step S204 for starting the declaration of parent-child relations depending on the number of ports obtained in step S204. Immediately after the bus reset, the number of ports is equal to the number of ports not yet defined. However, the number of ports not yet defined, which is detected in step S204, varies as the decision of parent-child relation progresses.

Immediately after the bus reset, the node for which parent-child relation can be first declared is limited to only a leaf. Whether the node is a leaf can be recognized by confirming the number of ports checked in step S203. In step S205, the leaf declares "I am a child and a partner is a parent" for the node to which the leaf is connected, thereby ending the process.

For the node which has been recognized in step S203 as having a plurality of ports and being a branch, the number of not-yet-defined ports >1 is determined in step S204 immediately after the bus reset. Accordingly, the processing goes to step S206 in which a flag indicating a branch is set. Then, in step S207, the node waits for accepting "parent" based on the declaration of parent-child relation from the leaf.

For the branch having accepted in step S207 the declaration of parent-child relation from the leaf, the control flow returns to step S204 to confirm the number of ports not yet defined. If the number of ports not yet defined is one, this means that the declaration of "I am a child and a partner is a parent" in step S205 can be made for the node which is connected to the remaining port. For the branch having two or more ports not yet defined as a result of the second or later confirmation in step S204, the processing goes to step S207 again to wait for accepting "parent" based on the declaration of parent-child relation from the leaf or another branch.

Finally, if the number of ports not yet defined becomes zero as a result of the confirmation in step S204 for any one branch or a leaf as an exceptional case (because the leaf has not operated so fast though it can declare "child"), this means that the declaration of parent-child relation is completed for the entire network. For only one node for which the number of ports has not yet been confirmed to be zero (i.e., for which all ports have been decided as parent ports), a flag indicating a root is set in step S208. Then, in step S209, that node is recognized as a root.

In this way, the process from the bus reset to the declaration of parent-child relation for all the nodes in the network, shown in FIG. 20, is completed.

Next, the flowchart of FIG. 21 will be described.

Since flag information indicating a leaf, branch or root is set for each node in the sequence of steps shown in FIG. 20, the nodes are classified in step S301 based on the flag information.

In the operation of allocating IDs to the nodes, the node which can first set an ID is a leaf. IDs are set by allocating numbers increasing from zero (i.e., node number =0–) in the order of leaf, branch and root.

In step S302, the number N (N is a natural number) of leaves present in the network is set. After that, in step S303, each leaf requests the root to give an ID to the leaf. If there are a plurality of requests, the root carries out arbitration between the requests (operation of selecting one request) in step S304. In step S305, an ID number is given to one node which has won the arbitration, and a failure in ID setting is provided to the nodes which have been defeated in the arbitration. Each leaf which has failed in acquiring ID issues an ID request again in step S306, followed by repeating the steps mentioned above. In step S307, the leaf which has succeeded in acquiring an ID number broadcasts its own self-ID packet to all the nodes.

The self-ID packet contains ID information of the node, the number of ports of the node, the number of ports already connected, information indicating whether each port is a parent or a child, information indicating whether the node has an ability allowing the node to serve as a bus manager (if the node has such an ability, a contender bit in the self-ID packet is set to 1, and if the node does not have such an ability, the contender bit is set to 0), etc.

The ability allowing the node to serve as a bus manager means such an ability that the node can perform the four kinds of bus management set forth below.

(1) Bus Power Management

The node can determine whether each of the devices on the network constructed as shown in FIG. 7 is required to be supplied with power through the power lines in the connecting cable, or whether each device is supplied with power independently. Also, the node can manage the time when power is supplied to each device.

(2) Keeping of Speed Map

The node can maintain communication speed information of the devices on the network.

(3) Keeping of Network Structure (Topology Map)

The node can maintain information regarding a tree structure of the network as shown in FIG. 12.

(4) Optimization of Bus Based on Information Obtained from Topology Map

The node (which is selected as a bus manager through later-described procedures) performs the bus management in the entire network.

Also, the node having the ability to serve as a bus manager (i.e., the node broadcasting the self-ID packet with the contender bit set to 1) stores information in the self-ID packet broadcast from each of the remaining nodes, and other information such as communication speeds. When that node is selected as a bus manager, it constructs a speed map and a topology map based on the stored information.

After one node has broadcast the node ID information, the number of remaining leaves is counted down by one in step S308. If the number of remaining leaves is not less than one in step S309, the above-described process from the operation of requesting ID in step S303 is repeated. Finally, if all the leaves have broadcast the node ID information, N=0 is satisfied in step S309 and the processing goes to an ID setting process for branches.

The ID setting of branches is performed in a like manner to the ID setting of leaves.

First, in step S310, the number M (M is a natural number) of branches present in the network is set. After that, in step S311, each branch requests the root to give an ID to the branch. In response to requests, the root carries out arbitration between the requests in step S312. ID numbers increasing from the last number given to the leaf are allocated to respective branches successively starting from the branch which has first won the arbitration. In step S313, the root provides the ID information (or a failure result) to each of the branches having requested IDs. Each branch which has failed in acquiring an ID issues an ID request again in step S314, followed by repeating the steps mentioned above.

In step S315, the branch which has succeeded in acquiring the ID number broadcasts its own self-ID packet to all the nodes. After one node has broadcast the node ID information, the number of remaining branches is counted down by one in step S316. If the number of remaining branches is not less than one in step S317, the above-described process from the operation of requesting an ID in step S311 is repeated until all the branches finally broadcast the node ID information. If all the branches acquire the node IDs, M=0 is satisfied in step S317, thereby ending the branch ID setting mode.

At a point in time after the above branch ID setting mode is ended, the node which has not yet acquired ID information is only a root. Therefore, a number next to the largest among the numbers having been already allocated to the other nodes is set as the ID number of the root in step S318, and the root broadcasts its own self-ID packet in step S319.

Through the process described so far, it becomes apparent which node has the ability to serve as a bus manager. If a plurality of nodes finally have an ability to serve as a bus manager, the node having the largest ID number is selected as the bus manager.

When the root has the ability to serve as the bus manager, the root is selected as the bus manager because its ID number is the largest in the network. When the root does not have the ability to serve as the bus manager, the root which has the second largest ID number (as compared with that of the root and the contender bit in the self-ID packet is set to 1) is selected as the bus manager. Which node has been selected as the bus manager can be ascertained by all the nodes as a matter recognized by all of them because each node broadcasts its own self-ID packet at the time of acquiring the ID number in the process shown in FIG. 21 and each node keeps the information in the self-ID packets broadcast from the other nodes.

The procedures for setting IDs of all the nodes and the bus manger after determining the parent-child relation for each node, as shown in FIG. 21, are thus ended.

Next, the operation in the actual network shown in FIG. 12 will be described, by way of example, with reference to FIG. 12.

The network shown in FIG. 12 has a hierarchical structure such that the nodes A and C are directly connected to the (root) node B at a level lower than the latter, the node D is directly connected to the node C at a level lower than the latter, and the nodes E and F are directly connected to the node D at a level lower than the latter. The procedures for deciding the hierarchical structure, the root node, and the node IDs will be described below.

After the bus reset, the declaration of parent-child relation is fist made between ports of the nodes, which are directly connected to each other, for recognizing the connection status of each node. The parent-child relation means that the parent side lies at a higher level and the child side lies at a lower level in the hierarchical structure.

In the network of FIG. 12, the node which has first declared parent-child relation after the bus reset is the node A. Basically, the declaration of parent-child relation can be started from a node (called a leaf) in which only one port is connected to another node. Such a node can detect by itself that only one port thereof is connected to another node. Upon detecting the fact, the node recognizes that it is positioned at the end of the network. Then, the parent-child relation is successively decided from the node which has finished the recognizing operation at the earliest timing. The port of the node which has declared a parent-child relation (e.g., the node A between A and B) is set to a child, whereas the port of the partner node (the node B) is set to a parent. As a result, the nodes A and B, the nodes E and D, and the nodes F and D are decided respectively as a child and a parent.

The declaration process then moves up a rank. The declaration of parent-child relation is likewise made toward an upper level node successively from one of nodes having a plurality of ports connected (called a branch) which has earlier accepted the parent-child relation from another node. In the network of FIG. 12, after the parent-child relation has been decided between D and E and between D and F, the node D first declares parent-child relation to the node C. As a result, the nodes D and C are decided respectively as a child and a parent.

After accepting the declaration of parent-child relation from the node D, the node C declares parent-child relation to the node B which is connected to the other port of the node C. As a result, the nodes C and B are decided respectively as a child and a parent.

As described above, the hierarchical structure shown in FIG. 12 is constructed, and the node B, for which all ports thereof connected to the other nodes have been finally decided as parents, is decided as a root node. One network system includes only one root.

While the node B is decided as a root node in FIG. 12, the root node could possibly shift to another node if the node B (having accepted the declaration of a parent-child relation from the node A) declares a parent-child relation to another node at an earlier time. In other words, any node has the possibility to become the root node depending on the timing at which its declaration of a parent-child relation is transmitted, and a certain node is not always decided as the root node even in the same network configuration.

After deciding the root node, the network enters the mode of deciding node IDs. In this mode, each node provides its own node ID to all of the other nodes (broadcasting function).

Self-ID information of the node contains the self-node number, information regarding the position at which it is connected, the number of ports possessed by the node, the number of ports connected to other ports, information regarding parent-child relation for each port, etc.

The procedures for allocating the node ID numbers can be started from one of nodes (leaves) each having only one port connected to another node. The node ID numbers =0, 1, 2, . . . are then allocated in sequence to those nodes.

Upon receiving the node ID number, each node broadcasts self-ID information containing the node ID number to all of the other nodes. This permits the other nodes to recognize that the broadcast ID number has been already allocated.

After all the leaves have acquired their own node IDs, the mode proceeds to the operation of deciding IDs of branches, and increasing node ID numbers subsequent to the largest number given to the last leaf are allocated to the branches successively. As with the leaves, upon receiving the node ID number, each branch broadcasts self-ID information in sequence with all of the other nodes. Finally, the root node broadcasts self-ID information. Thus the root always has the largest node ID number.

As described above, node ID numbers are allocated to all the nodes in the entire the hierarchical structure, the network configuration is reconstructed, and the bus initialization is completed.

(Arbitration)

In the 1394 serial bus, arbitration for the right of using the bus is always performed prior to data transfer. The 1394 serial bus constructs such a logical bus type network that each of devices individually connected to the bus relays a signal transferred to it, whereby the same signal is transmitted to all the devices in the network. Accordingly, arbitration is essential for the purpose of avoiding collision between packets. The arbitration enables only one node to transfer a packet at a certain time.

The arbitration will be described below with reference to FIG. 13A which illustrates a process of requesting the right of using the bus, and FIG. 13B which illustrates a process of permitting/rejecting the use of the bus.

Upon the start of arbitration, one or several nodes issue requests the right of using the bus toward the corresponding parent nodes. In FIG. 13A, the nodes C and F are nodes issuing requests for the right of using the bus. The parent node having received the request (i.e., the node A in FIG. 13A) further issues (relays) a request for the right of using the bus toward the succeeding parent node. Those requests finally reach the root which performs the arbitration.

The root node having received the requests for the right of using the bus decides which node is permitted to use the bus. The arbitration process can be executed by only the root node, and the node which has won the arbitration is given with the right of using the bus. In FIG. 13B, the use of the bus is permitted to the node C, and the node F is rejected from using the bus. A DP (Data Prefix) packet is sent to the node which has been rejected in the arbitration, thereby informing the node that the use of the bus has been rejected. The request for the right of using the bus, which has been issued from the rejected node, is left standing to wait for the next arbitration.

The node, which has won the arbitration and has gained permission for the use of the bus, can start data transfer subsequently.

A sequence of the arbitration steps will now be described with reference to a flowchart of FIG. 22.

When the node starts data transfer, the bus must be in an idle state for enabling the data transfer to start. Whether a preceding data transfer is ended and the bus is in an idle state at present can be recognized by checking the lapse of a predetermined idle time gap length (e.g., a subaction gap) which is uniquely set for each transfer mode. If the subaction gap has lapsed, each node determines that the node itself can start the data transfer.

In step S401, it is determined whether the predetermined gap length corresponding to data to be transferred (such as Asynch data or Iso data) is obtained. Unless the predetermined gap length is obtained, any node cannot request the right of using the bus that is needed for starting the data transfer. Accordingly, each node waits until the predetermined gap length is obtained.

If the predetermined gap length is obtained in step S401, it is determined in step S402 whether there is data to be transferred. If so, the processing goes to step S403 in which each node issues a request for the right of using the bus to the root for securing the bus to start the data transfer. At this time, a signal representing the request for the right of using the bus is transmitted so as to finally reach the root after being relayed from one to another device in the network, as shown in FIG. 13. If there is no data to be transferred in step S402, the node goes into a standby state.

Then, if the root receives in step S404 one or more requests for the right of using the bus issued in step S403, the root checks the number of nodes requesting the use of the bus in step S405. If the number of nodes requesting the use of the bus is equal to one in step S405 (i.e., if only one node has issued the request for the right of using the bus), the right of using the bus immediately thereafter is granted to that node. If the number of nodes requesting the use of the bus is more than one in step S405 (i.e., if a plurality of nodes have issued requests for the right of using the bus), the root performs a arbitration process in step S406 for deciding one node which is allowed to use the bus. The arbitration process is made impartial so that permission is not given to the same node at every time, but the right of using the bus is equally permitted to all the nodes.

In step S407, the plurality of nodes requesting the use of the bus in step S406 are classified into one node which has gained the right of using the bus as a result of the arbitration performed by the root, and the other nodes which have been rejected in the arbitration. Then, in step S408, the root transmits a permission signal to one node which has gained the right of using the bus as a result of the arbitration, or the node which has gained the right of using the bus without the arbitration because the number of nodes requesting the use of the bus is equal to one in step S405. Immediately after receiving the permission signal, the node starts the transfer of data (a packet to be transferred). In step S409, the root transmits a DP (Data Prefix) signal indicating a failure in the arbitration to each of the nodes which has been rejected in the arbitration in step S406 and rejected from using the bus. The node having received the DP packet returns to step S401, and then waits until the predetermined gap length is obtained, followed by issuing the requests for the right of using the bus to start the data transfer.

The arbitration process has been described above with reference to the flowchart of FIG. 22.

(Asynchronous Transfer)

In asynchronous transfer, data is transferred in an asynchronous manner. FIG. 14 shows state transitions over time in the asynchronous transfer mode. The first subaction gap in FIG. 14 represents an idle state of the bus. At the time when the idle time has reached a certain value, the node desiring to start the data transfer determines that the bus is available, following which the arbitration is executed to secure the bus.

After gaining permission of the use of the bus as a result of the arbitration, the data transfer is executed in the form of a packet. After the data transfer, the node having received the data responds to the data transferred to it by sending back an ACK (return code for confirming reception) as a result of the reception after a short gap called the ACK GAP, or by transmitting a response packet, whereupon the packet transfer is completed. The ACK comprises information of 4 bits and checksum of 4 bits. The ACK includes information indicating whether the destination node of the transmission has succeeded in receiving the data, or whether it is in a busy state or a pending state, and is sent back to the source node at once.

Next, FIG. 15 shows an example of a packet format for use in the asynchronous transfer mode.

A packet comprises a data portion, a data CRC for error correction, and a header portion. The destination node ID, the source node ID, the length of transferred data, various codes, etc. are written in the header portion as shown in FIG. 15, and then transferred.

Also, the asynchronous transfer is communication carried out in one-to-one relation from some node to a partner node. A packet transferred from the source node is routed to all the nodes in the network, but the node ignores the packet having an address other than belonging to itself. Accordingly, the packet is read by only one destination node.

The asynchronous transfer has been described above.

(Isochronous Transfer)

In isochronous transfer, data is transferred in an isochronous manner. The isochronous transfer, which can be the biggest feature of the 1394 serial bus, is a transfer mode suitable for multimedia such as video data and voice data, particularly, which require real-time transfer.

Also, while the asynchronous transfer is a one-to-one relation transfer, the isochronous transfer renders a packet to be transferred from one source node equally to all the other nodes with the broadcasting function.

FIG. 16 shows state transition over time in the isochronous transfer mode.

The isochronous transfer is executed with certain time intervals on the bus. This time interval is called an isochronous cycle. The time of one isochronous cycle is 125 μs. A cycle start packet indicates the start time of each cycle, and serves to perform time adjustment for each node. The cycle start packet is transmitted by a node called a cycle master. After a predetermined idle period (subaction gap) has elapsed subsequent to the end of packet transfer in the preceding cycle, the cycle master transmits the cycle start packet indicating the start of the current cycle. The time interval at which the cycle start packet is transmitted is 125 μs.

Also, as indicated by channels A, B and C in FIG. 16, plural types of packets can be separately transferred in one cycle by allocating channel IDs to those packets respectively. This enables packets to be transferred in real time between a plurality of nodes at the same time. The node on the receiving side takes in data of only the packet assigned with the channel ID that is desired by the node itself. The channel ID does not represent the address of the destination of transmission, but merely indicates a logical number (or character) given to each packet data for discrimination. Therefore, when some packet is transmitted, the packet is broadcast so that it is routed from one source node to all of the other nodes.

Prior to transmitting a packet in the isochronous transfer mode, arbitration is performed as with the asynchronous transfer mode. However, because the isochronous transfer mode is not a one-to-one communication (unlike the asynchronous transfer mode), there is no ACK (return code for confirming reception) in the isochronous transfer mode.

Further, an ISO GAP (isochronous gap) shown in FIG. 16 represents an idle period necessary for recognizing that the bus is in an idle state, prior to starting the isochronous transfer. At the time when the predetermined idle period has elapsed, the node desiring to start the isochronous transfer determines that the bus is in an idle state, following which an arbitration is conducted before the packet transfer can be executed.

Next, FIG. 17 shows an example of a packet format for use in the isochronous transfer mode.

Various packets are separated into channels and each comprises a data portion, a data CRC for error correction, and a header portion. The length of transferred data, the channel No., various codes, a header CRC for error correction, etc. are written in the header portion as shown in FIG. 17, and then transferred.

The isochronous transfer mode has been described above.

(Bus Cycle)

In actual transfer on the 1394 serial bus, the isochronous transfer and the asynchronous transfer can be executed in mixed fashion. FIG. 18 shows transfer state transitions on the bus over time when the isochronous transfer and the asynchronous transfer are executed in mixed fashion.

The isochronous transfer is executed in preference to the asynchronous transfer. The reason is that after the cycle start packet, the isochronous transfer can be started with a shorter gap length (isochronous gap) than the gap length (subaction gap) of an idle period required for starting the asynchronous transfer. Accordingly, execution of the isochronous transfer is given with higher priority than that of the asynchronous transfer.

In a general bus cycle shown in FIG. 18, the cycle start packet is transferred from the cycle master to each node at the start of a cycle #m. Upon receiving the cycle start packet, each node performs time adjustment. After waiting for the predetermined idle period (isochronous gap), the node which is going to execute the isochronous transfer enters arbitration and then starts the packet transfer. In FIG. 18, channels e, s and k are transferred by isochronous transfer in sequence.

The above process from the arbitration to the packet transfer is repeated in times corresponding to the number of channels given. Subsequently, when the isochronous transfer in the cycle #m is completed, the asynchronous transfer can be started.

Upon the idle time reaching the end of the subaction gap necessary for starting the asynchronous transfer, the node which is going to execute the asynchronous transfer determines that it may enter the arbitration.

However, the asynchronous transfer can be started only when the subaction gap necessary for starting the asynchronous transfer is obtained during a period from the end of the isochronous transfer to the time (CYCLE SYNCH) at which the next cycle start packet is transferred.

In the cycle #m shown in FIG. 18, three channels are first transferred by isochronous transfer, and two packets (packets 1 and 2) are then transferred by asynchronous transfer (including ACK). The transfer in the cycle #m is ended by sending the asynchronous packet 2 because the time (CYCLE SYNCH) to start the next cycle (m+1) is reached after the asynchronous packet 2.

If the time (CYCLE SYNCH) to transmit the next cycle start packet is reached during the operation of the asynchronous or isochronous transfer, the operation is not forcibly suspended, and the cycle start packet for the next cycle is transmitted after waiting for the idle period subsequent to the pending transfer. In other words, if one cycle continues over 125 µs, it is assumed that the next cycle is contracted from the reference period, i.e., 125 µs, by an amount corresponding to the extension of the preceding cycle. Thus the isochronous cycle can be extended and contracted from the reference period of 125 µs.

In order to maintain real-time transfer, however, the asynchronous transfer is always executed in each cycle if necessary. Due to contraction of the cycle time, the asynchronous transfer may be delayed to the next or subsequent cycle.

The above-described process, including such delay information, is managed by the cycle master.

(WWID (World Wide Unique ID))

According to the 1394 serial bus standards, each node incorporates a configuration ROM for expressing its own functions. FIG. 23 shows a part of the configuration ROM.

Referring to FIG. 23, IDs stored in addresses from FFFFF000040C to FFFFF0000410 comprise a vendor ID 2301 of three bytes and chip IDs 2302, 2303 of five bytes. The vendor ID 2301 is an ID acquired by each vendor as a result from applying for the ID from the IEEE, and contains information indicating, e.g., the name of each vendor. The chip IDs 2302, 2303 are allocated at the vendor's discretion, and are set to a unique ID for each node. There is hence no ID that is the same as the unique ID (2301–2303) of each node.

The above ID (2301–2303) uniquely allocated for each node is called a World Wide Unique ID (referred to a WWUID hereinafter). Each node on a network constructed with the IEEE 1394 serial bus can know the WWUID by reading the IDs at the addresses from FFFFF000040C to FFFFF0000410 in the configuration ROM of a device which is connected to the bus and has an objective node ID.

The IEEE 1394 serial bus has been described above.

As seen from the above description, the IEEE 1394 I/F has various advantages overcoming the inconveniences experienced in conventional data communication systems. In particular, since the IEEE 1394 I/F can transfer a large amount of data, such as image information, at a high speed along with device control data, using the IEEE 1394 I/F makes it possible to construct a new system wherein an imaging device represented by a video camera is controlled by a PC.

Stated otherwise, the present invention intends to construct a system for controlling a camera control unit originally incorporated in an imaging device, by outputting an operation command or instructing some change of a control method from a PC to thereby permit the imaging device to execute an operation different from that commanded by remote control, or some change of the control method executed by the camera control unit originally incorporated in the imaging device, to thereby carry out an operation to perform a special operation in the video camera being controlled.

FIG. 24 shows an example of screen display of an application (referred to a camera setting application) for operating and controlling a camera from a PC as mentioned above.

The camera setting application operates in a condition where a PC 2501 and a video camera 2505 are connected to each other by a 1394 serial bus 2504, as shown in FIG. 25. The user can freely change the setting of various control parameters in the video camera 2505, such as tint, color gain, f-stop number and shutter speed, by using a keyboard 2503 or a pointing device 2502. For example, when a shutter speed changing lever 2405 is moved to the left or right with the pointing device 2502, a setting value corresponding to the lever position is transmitted from the PC 2501 to the video camera 2505 via the 1394 serial bus 2504. The video camera 2505 can actually change the shutter speed by storing the setting value at a predetermined location in an internal memory.

Here, the 1394 serial bus can transmit and receive both image data and a command group (CTS) for controlling a partner device at the same time. Therefore, when the video camera 2505 transmits image data to the PC 2501, the user can confirm the camera image on a screen of the PC 2501 in real time. A camera image display window 2401 on the camera setting application screen of FIG. 25 is a screen for displaying in real time an image transmitted from the video camera 2505. In other words, by changing the setting of control parameters of the video camera from the PC in such a manner as described above, the user can immediately confirm a result of the change on the camera image display window 2401.

The illustrated conventional example includes several kinds of camera control parameters which are changeable, but there exist many other parameters which can be set from the PC. FIG. 28 shows examples of commands transmitted from the PC for changing the parameters.

Although the camera setting application carries out the above-described function in the condition where the video camera 2505 and the PC 2501 are connected to each other as shown in FIG. 25, there is a simulation mode in the camera setting application. The simulation mode means such a function that the PC simulates an optimum image by itself alone by changing the setting of camera control parameters with respect to an original image picked up by the camera.

The simulation mode will be briefly described below with reference to FIGS. 26 and 27.

FIG. 26 shows an example in which a sunset scene shot by the user is displayed on the camera image display window 2401 in the simulation mode. An operating mode 2407 of the camera setting application is selected to "SIMULATION" by the pointing device. In this condition, the camera setting application stops the PC from taking in image information from the video camera, and an image, which is simulated as described later, is continuously displayed on the camera image display window 2401.

In the case of shooting the setting sun, the user generally desires to produce an image rich in red. With usual auto-setting of the video camera, however, an auto-white balancing function is operated to suppress a component of red color to become as close as possible to white. Accordingly, red color of the taken-in image is lightened, and a sunset scene cannot be shot as desired. Then, the user changes the setting of camera control parameters on the camera setting application screen, such as tint 2402, color gain 2403, f-stop number 2404, shutter speed 2405, and quakeproof on/off 2406, by using the pointing device or the keyboard on the PC. For example, the tint 2402 is set nearer to the blue side in an initial image, but the tint setting is changed to come closer to the red side for emphasizing the red color of the sunset. Corresponding to the lever position of the tint 2402 to be changed, the camera setting application changes the camera control parameters so that the same image on the camera image display window 2401 has a tint corresponding to the change in the parameter. Thus, the image displayed on the camera image display window 2401 has the tint emphasized in red. Likewise, the user can change the setting of the other parameters, such as the color gain 2403 and the f-stop number 2404, in accordance with his/her preference while confirming a simulated image on the camera image display window 2401. Finally, the user can obtain the optimum camera setting as shown in FIG. 27.

Further, the optimum camera setting can be stored as a file in the memory within the PC by manipulating a file menu 2408 on a task bar. The stored setting can be transmitted to the video camera when it is connected to the PC again, enabling the video camera to be set to "an optimum condition for shooting the sunset".

The above-described related art however has the following problem. Even with the video camera being not connected, the optimum camera setting parameters can be decided based on simulation. Accordingly, when the video camera is connected to the PC later, there occurs a discrepancy between setting values in the video camera and values changed on the PC. As a result, the operation of the camera setting application and the actual operation of the video camera can not be matched with each other.

SUMMARY OF THE INVENTION

The present invention has been made in the view of the problem set forth above, and its object is, in a camera setting system wherein a control device, such as a PC, and a video camera are connected to each other, to automatically avoid a mismatch between setting values on the PC side and camera setting values in the video camera which occurs immediately after the connection therebetween, immediately after the PC and the video camera are connected again.

Another object of the present invention is, in a camera setting system wherein a control device, such as a PC, and a video camera are connected to each other, and particularly in a camera setting system having a simulation function, to automatically avoid a mismatch between setting values on the PC side, which have been changed upon execution of simulation, and unchanged setting values in the video camera, immediately after the PC and the video camera are connected again.

Still another object of the present invention is, in a camera setting system wherein a control device, such as a PC, and a plurality of video cameras are connected to each other, to avoid a mismatch between setting values on the PC side, which correspond to a particular one of the video cameras, and camera setting values in the particular video camera, immediately after the connection therebetween.

Still another object of the present invention is, in a camera setting system wherein a control device, such as a PC, and a plurality of video cameras are connected to each other, and particularly in a camera setting system having a simulation function, to automatically avoid a mismatch between setting values on the PC side, which have been changed upon execution of simulation, and unchanged setting values in a particular one of the video cameras, immediately after the PC and the particular video camera are connected again.

Still another object of the present invention is, in a camera setting system wherein a control device, such as a PC, and a plurality of video cameras are connected to each other, to surely select a particular one of the video cameras by utilizing IDs specific to the video cameras, and to automatically avoid a mismatch between setting values on the PC side, which have been changed and correspond to the selected video camera, and camera setting values in the selected video camera.

Still another object of the present invention is, in a camera setting system wherein a control device, such as a PC, and a video camera are connected to each other, to avoid a mismatch between a display of setting values on the PC side and camera setting values in the video camera, immediately after the connection therebetween.

Still another object of the present invention is, in a camera setting system wherein a control device, such as a PC, and a plurality of video cameras are connected to each other, to avoid a mismatch between a display of setting values on the PC side, which correspond to particular one of the video cameras, and camera setting values in the particular video camera, immediately after the connection therebetween.

Still another object of the present invention is, in a camera setting system wherein a control device, such as a PC, and a plurality of video cameras are connected to each other, to surely select a particular one of the video cameras by utilizing IDs specific to the video cameras, and to avoid a mismatch between a display of setting values on the PC side, which correspond to the particular video camera, and camera setting values in the selected video camera, immediately after the connection therebetween.

Still another object of the present invention is to produce an alarm display when setting values on the PC side (which correspond to a particular video camera) differ from camera setting values in a selected video camera.

To solve the above-described problem and to achieve the above-mentioned objects, the present invention provides an imaging device system comprising a control device having a first data communication node, and an imaging device having a second data communication node connected to the first data communication node in a mutually communicable manner. The imaging device includes a controlled unit capable of being externally controlled in accordance with information inputted from the second data communication node. The control device comprises a control unit for outputting the information to control the imaging device from the first data communication node, a storage unit for storing at least one or more preset imaging device control conditions, and a control condition changing unit for changing the imaging device control conditions stored in the storage unit. A detecting unit is provided for detecting whether the control device and the imaging device are connected, and an output unit is started up in response to a detection signal from the detecting unit for reading the imaging device control conditions stored in the storage unit and outputting the read control conditions from the first data communication node.

In the above imaging device system according to the present invention, the control device may further comprise a display unit for displaying an image corresponding to the imaging device control conditions changed by the control condition changing unit.

Also, the present invention provides an imaging device system comprising a control device having a first data communication node, and a plurality of imaging devices having second to N-th (N is an integer not less than three) data communication nodes connected to the first data communication node in a mutually communicable manner. The plurality of imaging devices include controlled units capable of being externally controlled in accordance with information inputted respectively from the second to N-th data communication nodes. The control device comprises a control unit for outputting the information to control the plurality of imaging devices individually from the first data communication node, a first storage unit for storing at least one or more imaging device control conditions preset corresponding to each of the plurality of imaging devices, and a selecting unit for selecting one among the plurality of imaging devices which is to be controlled. A control condition changing unit is provided for changing the imaging device control conditions stored in the first storage unit and corresponding to the imaging device selected by the selecting unit. A detecting unit is provided for detecting whether the control device and the selected imaging device are connected, and an output unit started up in response to a detection signal from the detecting unit for reading the imaging device control conditions changed by the control condition changing unit and outputting the read control conditions from the first data communication node.

In the above imaging device system according to the present invention, the control device may further comprise a display unit for displaying an image corresponding to the imaging device control conditions changed by the control condition changing unit.

In the above imaging device system according to the present invention, the selecting unit may select a particular one among the plurality of connected imaging devices by outputting an ID number specific to the particular imaging device from the first data communication node.

Further, the present invention provides an imaging device system comprising a control device having a first data communication node, and an imaging device having a second data communication node connected to the first data communication node in a mutually communicable manner. The imaging device comprises a controlled unit capable of being externally set to a particular state in accordance with a command inputted from the second data communication node, and a transmitting unit capable of externally transmitting the particular set state. The control device comprises a control unit for outputting, from the first data communication node, a command to set the imaging device to a particular state and a command to read a particular setting value in the imaging device, a storage unit for storing at least one or more preset imaging device setting values, and a display unit for displaying the stored setting values. A detecting unit is provided for detecting whether the control device and the imaging device are connected. An output unit is started up in response to a detection signal from the detecting unit and outputs the command to read the particular setting value in the imaging device from the first data communication node. An input unit is provided for inputting, into the storage unit, the particular setting value read in accordance with the command outputted from the output unit.

Still further, the present invention provides an imaging device system comprising a control device having a first data communication node, and a plurality of imaging devices having second to N-th (N is an integer not less than three) data communication nodes connected to the first data communication node in a mutually communicable manner. The plurality of imaging devices includes controlled units capable of being externally controlled to set the plurality of imaging devices to particular states in accordance with commands inputted respectively from the second to N-th data communication nodes. A transmitting unit is provided that is capable of externally transmitting the particular set states. The control device comprises a control unit for outputting, from the first data communication node, commands to individually set the plurality of imaging devices to particular states, and commands to individually read particular setting values in the plurality of imaging devices. A storage unit is provided for storing at least one or more preset imaging device setting values corresponding to each of the plurality of imaging devices. A selecting unit is provided for selecting one among the plurality of imaging devices which is to be controlled. A display unit is provided for displaying the stored setting values corresponding to the imaging device selected in the selecting step. A detecting unit is provided for detecting whether the control device and the selected imaging device are connected. An output unit is started up in response to a detection signal from the detecting unit, for outputting the command to read the particular setting value in the selected imaging device from the first data communication node. An input unit is provided for inputting, in an area of the storage unit corresponding to the selected imaging device, the particular setting value read in accordance with the command outputted from the output unit.

In the above imaging device system according to the present invention, the selecting unit may select a particular one among the plurality of connected imaging devices by outputting an ID number specific to the particular imaging device from the first data communication node.

The above imaging device system according to the present invention may further comprise a comparing unit for comparing the read particular setting value in the imaging device with the corresponding imaging device setting value stored in the storage unit before reading the particular setting value, and an alarm display unit started up by the comparing unit.

Moreover, the present invention provides a control method for an imaging device system comprising a control device having a first data communication node, and an imaging device having a second data communication node connected to the first data communication node in a mutually communicable manner. The control method comprises a control step of outputting information to control the imaging device from the second data communication node, a storing step of storing at least one or more preset imaging device control conditions, and a control condition changing step of changing the imaging device control conditions stored in the storing step. A detecting step is provided for detecting whether the control device and the imaging device are connected, and an output step is provided for, in accordance with a detection result in the detecting step, reading the imaging device control conditions stored in the storing step and outputting the read control conditions from the first data communication node.

Further, the present invention provides a control method for an imaging device system comprising a control device having a first data communication node, and a plurality of imaging devices having second to N-th (N is an integer not less than three) data communication nodes connected to the first data communication node in a mutually communicable manner. The control method comprises a control step of outputting information to control the plurality of imaging devices individually from the first data communication node, a first storing step of storing at least one or more imaging device control conditions preset corresponding to each of the plurality of imaging devices, and a selecting step of selecting one among the plurality of imaging devices which is to be controlled. A control condition changing step is provided for changing the imaging device control conditions corresponding to the imaging device selected in the selecting step. A detecting step is also provided for detecting whether the control device and the selected imaging device are connected, and an output step is provided for, in accordance with a detection result in the detecting step, reading the imaging device control conditions changed in the control condition changing step and outputting the read control conditions from the first data communication node.

Still further, the present invention provides a control method for an imaging device system comprising a control device having a first data communication node, and an imaging device having a second data communication node connected to the first data communication node in a mutually communicable manner. The control method comprises a control step of outputting, from the first data communication node, a command to set the imaging device to a particular state and a command to read a particular setting value in the imaging device. A first storing step is provided for storing at least one or more preset imaging device setting values. A displaying step is also provided for displaying the stored setting values, and a detecting step is provided for detecting whether the control device and the imaging device are connected. An output step is provided for, in accordance with a detection result in the detecting step, outputting the command to read the particular setting value in the imaging device from the first data communication node. A second storing step is provided for storing the particular setting value read in accordance with the command outputted in the output step.

Still further, the present invention provides a control method for an imaging device system comprising a control device having a first data communication node, and a plurality of imaging devices having second to N-th (N is an integer not less than three) data communication nodes connected to the first data communication node in a mutually communicable manner. The control method comprises a control step of outputting, from the first data communication node, commands to individually set the plurality of imaging devices to particular states, and commands to individually read particular setting values in the plurality of imaging devices. A first storing step is provided for storing at least one or more preset imaging device setting values corresponding to each of the plurality of imaging devices, and a selecting step is provided for selecting one among the plurality of imaging devices which is to be controlled. A displaying step is provided for displaying the stored setting values corresponding to the imaging device selected in the selecting step, and a detecting step is provided for detecting whether the control device and the selected imaging device are connected. An output step is provided for, in accordance with a detection result in the detecting step, outputting the command to read the particular setting value in the selected imaging device from the first data communication node. A second storing step is provided for storing, corresponding to the selected imaging device, the particular setting value read in accordance with the command outputted in the output step.

Moreover, the present invention provides a storage medium storing a control program for controlling an imaging device system comprising a control device having a first data communication node, and an imaging device having a second data communication node connected to the first data communication node in a mutually communicable manner. The control program comprises code for a control step of outputting information to control the imaging device from the second data communication node, code for a storing step of storing at least one or more preset imaging device control conditions, and code for a control condition changing step of changing the imaging device control conditions stored in the storing step. Code is also provided for a detecting step of detecting whether the control device and the imaging device are connected. And code is provided for an output step of, in accordance with a detection result in the detecting step, reading the imaging device control conditions stored in the storing step and outputting the read control conditions from the first data communication node.

Further, the present invention provides a storage medium storing a control program for controlling an imaging device system comprising a control device having a first data communication node, and a plurality of imaging devices having second to N-th (N is an integer not less than three) data communication nodes connected to the first data communication node in a mutually communicable manner. The control program comprises code for a control step of outputting information to control the plurality of imaging devices individually from the first data communication node, and code for a first storing step of storing at least one or more imaging device control conditions preset corresponding to each of the plurality of imaging devices. Code is provided for a selecting step of selecting one among the plurality of imaging devices which is to be controlled. Code is also provided for a control condition changing step of changing the imaging device control conditions corresponding to the imaging device selected in the selecting step. Code is provided for a detecting step of detecting whether the control device and the selected imaging device are connected. And code is provided for an output step of, in accordance with a detection result in the detecting step, reading the imaging device control conditions changed in the control condition changing step and outputting the read control conditions from the first data communication node.

Still further, the present invention provides a storage medium storing a control program for controlling an imaging device system comprising a control device having a first data communication node, and an imaging device having a second data communication node connected to the first data communication node in a mutually communicable manner. The control program comprises code for a control step of outputting, from the first data communication node, a command to set the imaging device to a particular state, and a command to read a particular setting value in the imaging device. Code is also provided for a first storing step of storing at least one or more preset imaging device setting values. Code is provided for a displaying step of displaying the stored setting values, and code is provided for a detecting step of detecting whether the control device and the imaging device are connected. Code is also provided for an output step of, in accordance with a detection result in the detecting step, outputting the command to read the particular setting value in the imaging device from the first data communication node. And code is provided for a second storing step of storing the particular setting value read in accordance with the command outputted in the output step.

Still further, the present invention provides a storage medium storing a control program for controlling an imaging device system comprising a control device having a first data communication node, and a plurality of imaging devices having second to N-th (N is an integer not less than three) data communication nodes connected to the first data communication node in a mutually communicable manner. The control program comprises code for a control step of outputting, from the first data communication node, commands to individually set the plurality of imaging devices to particular states and commands to individually read particular setting values in the plurality of imaging devices. Code is also provided for a first storing step of storing at least one or more preset imaging device setting values corresponding to each of the plurality of imaging devices. Code is provided for a selecting step of selecting one among the plurality of imaging devices which is to be controlled. Code is also provided for a displaying step of displaying the stored setting values corresponding to the imaging device selected in the selecting step. Code is provided for a detecting step of detecting whether the control device and the selected imaging device are connected, and code is provided for an output step of, in accordance with a detection result in the detecting step, outputting the command to read the particular setting value in the selected imaging device from the first data communication node. And code is provided for a second storing step of storing, corresponding to the selected imaging device, the particular setting value read in accordance with the command outputted in the output step.

Also, the present invention provides an imaging device for use in any of the imaging device systems according to the present invention.

Further, the present invention provides a control device for use in any of the imaging device systems according to the present invention.

Still further, the present invention provides a control method implemented in an imaging device for executing the control method for any of the imaging device systems according to the present invention.

Still further, the present invention provides a control method implemented in a control device for executing the control method for any of the imaging device systems according to the present invention.

Moreover, the present invention provides an imaging device system comprising a control device having a first data communication node, and an imaging device having a second data communication node connected to the first data communication node in a mutually communicable manner. When the imaging device and the control device are connected, either imaging device control conditions set on the imaging device side or imaging device control conditions set on the control device side are set to both the imaging device and the control device.

Further, the present invention provides a control method for an imaging device system comprising a control device having a first data communication node, and an imaging device having a second data communication node connected to the first data communication node in a mutually communicable manner. When the imaging device and the control device are connected, either imaging device control conditions set on the imaging device side or imaging device control conditions set on the control device side are set to both the imaging device and the control device.

Still further, the present invention provides a storage medium storing a control program for controlling an imaging device system comprising a control device having a first data communication node, and an imaging device having a second data communication node connected to the first data communication node in a mutually communicable manner. The control program includes code for a step of, when the imaging device and the control device are connected, setting either imaging device control conditions set on the imaging device side or imaging device control conditions set on the control device side to both the imaging device and the control device.

BRIEF DESCRIPTION OF THE DRAWINGS

FIG. 23 shows address locations in a configuration ROM.

FIG. 28 is a table showing examples of camera setting commands.

FIG. 29 is a flowchart showing the third embodiment.

DESCRIPTION OF THE PREFERRED EMBODIMENTS

Preferred embodiments of the present invention will be described below in detail with reference to the accompanying drawings.

First Embodiment

Figure 1:
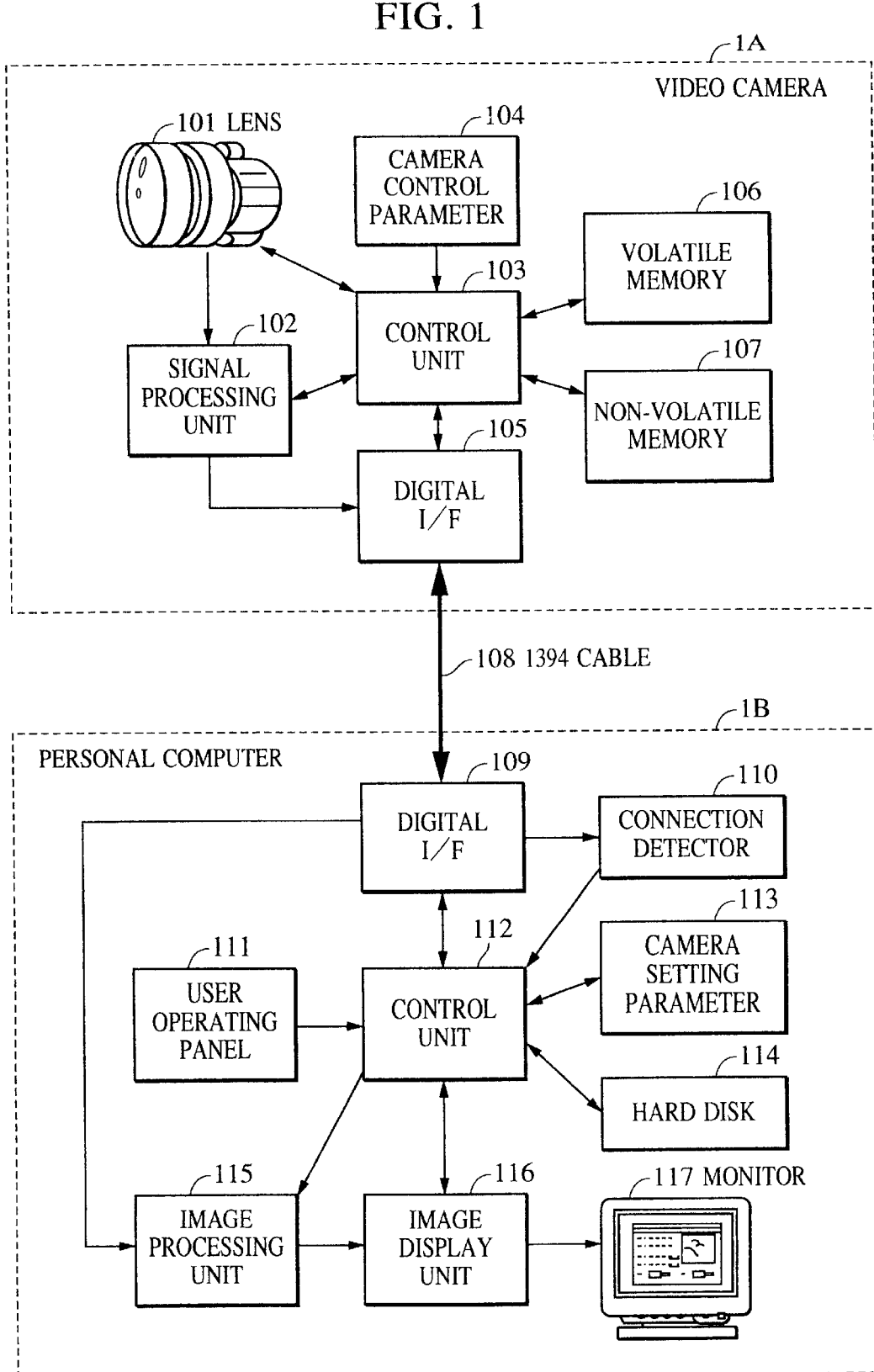
FIG. 1 is a block diagram showing a configuration of a first embodiment.

FIG. 1 is a block diagram showing a configuration of a first embodiment. A video camera 1A and a personal computer (PC) 1B are connected to each other by a 1394 serial bus cable 108.

Describing first a block on the video camera 1A side, numeral 101 denotes a lens, and 102 denotes a signal processing unit which includes an image pickup device for converting light inputted through the lens 101 into an image signal, and which converts the image signal outputted from the image pickup device into a digital image signal. Numeral 103 denotes a control unit for controlling the entirety of the video camera, and 104 denotes one or more camera control parameters read by the control unit 103 for controlling the lens 101 and the signal processing unit 102 to produce the digital image signal. Numeral 105 denotes a digital interface for receiving and outputting the digital image signal, various control information, etc. via the 1394 serial bus 108, and 106 denotes a volatile memory from and into which data is read and written by the control unit 103, the volatile memory temporarily storing camera setting values, etc. which are inputted from the digital interface 105. Numeral 107 denotes a non-volatile memory from and into which data is read and written by the control unit 103, the non-volatile memory finally storing the camera setting values, etc. which are inputted from the digital interface 105.

Next, a block on the PC 1B side will be described.

Numeral 109 denotes a digital interface for receiving the digital image from the video camera 1A via the 1394 serial bus 108 and outputting various command data, etc. from a control unit 112 to the 1394 serial bus 108, and 110 denotes a connection detector for detecting whether the video camera is connected to the 1394 serial bus 108. Numeral 111 denotes a user operating panel, such as a keyboard or a pointing device, through which the user operates the PC, and 112 denotes a control unit for controlling the entirety of the PC. Numeral 113 denotes one or more camera setting parameters read, written and changed by the control unit 112 in accordance with an input from the user operating panel 111, and 114 denotes a hard disk for storing the camera setting parameters 113 in the form of a file. Numeral 115 denotes an image processing unit which includes an image memory for storing the digital image information inputted from the video camera 1A via the digital interface 109, and which can apply a digital effect to the image in the memory upon receiving a command from the control unit 112. Numeral 116 denotes an image display unit for producing a window display image based on the digital image information outputted from the image processing unit 115 and the camera setting parameters, and outputting the produced image to a monitor 117.

The video camera 1A receives the camera setting parameters and a command, such as "Set" or "Write", from the digital interface 105, and carries out an internal operation corresponding to the command. Specifically, when the camera setting parameters and the command "Set" are inputted, the control unit 103 sets the inputted parameters in the volatile memory 106, and controls the lens 101 and the signal processing unit 102 by using those parameters temporarily. Also, when the camera setting parameters and the command "Write" are inputted, the control unit 103 writes the inputted parameters in both the volatile memory 106 and the non-volatile memory 107, and controls the lens 101 and the signal processing unit 102 by using those parameters after that. Here, the inputted camera setting parameters mean setting values of parameters capable of controlling the lens and the signal processing system to change the output image, such as tint, color gain, f-stop number and shutter speed, as described above in connection with the related art.

Figure 2:
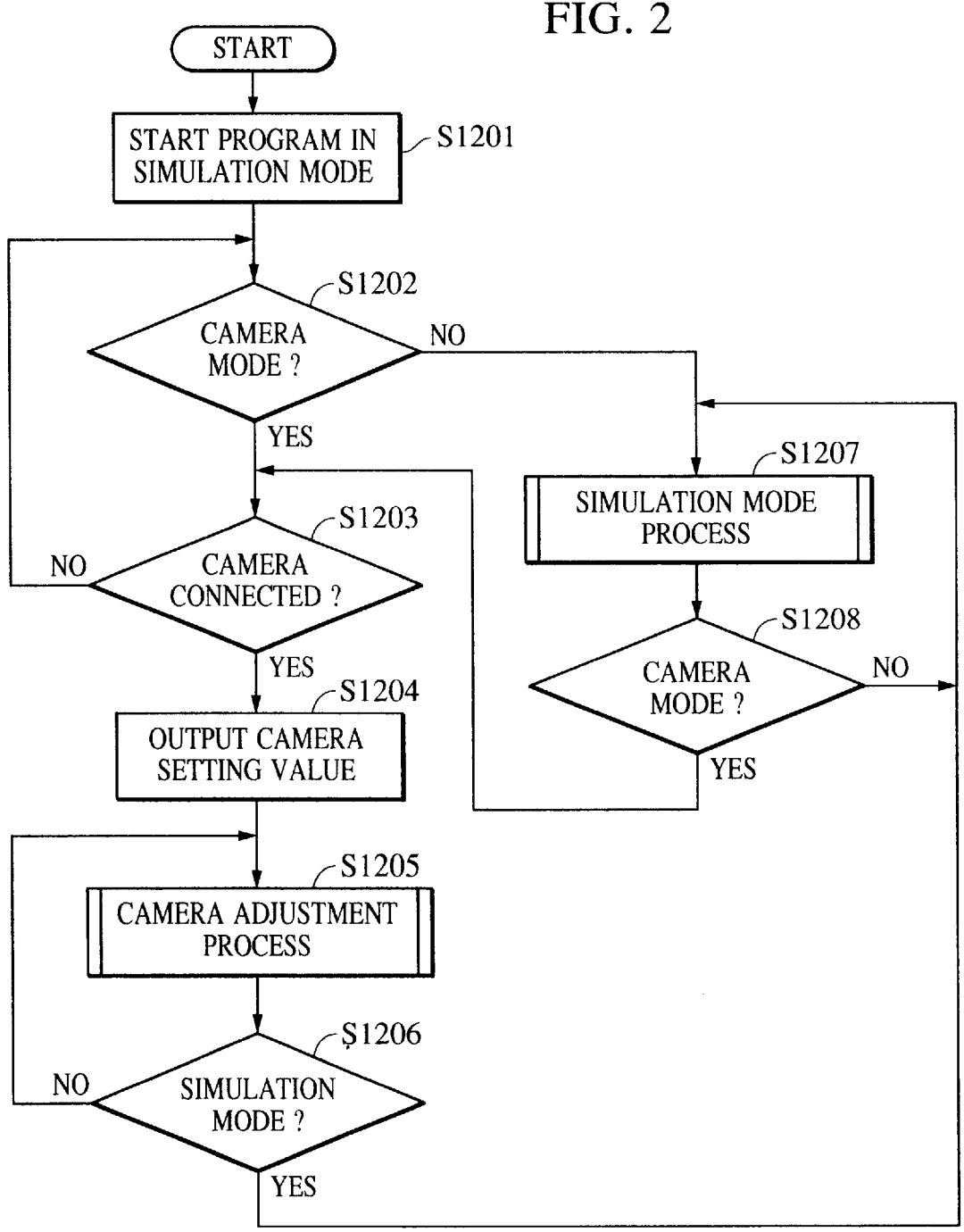
FIG. 2 is a flowchart for explaining the first embodiment.
Figure 24:
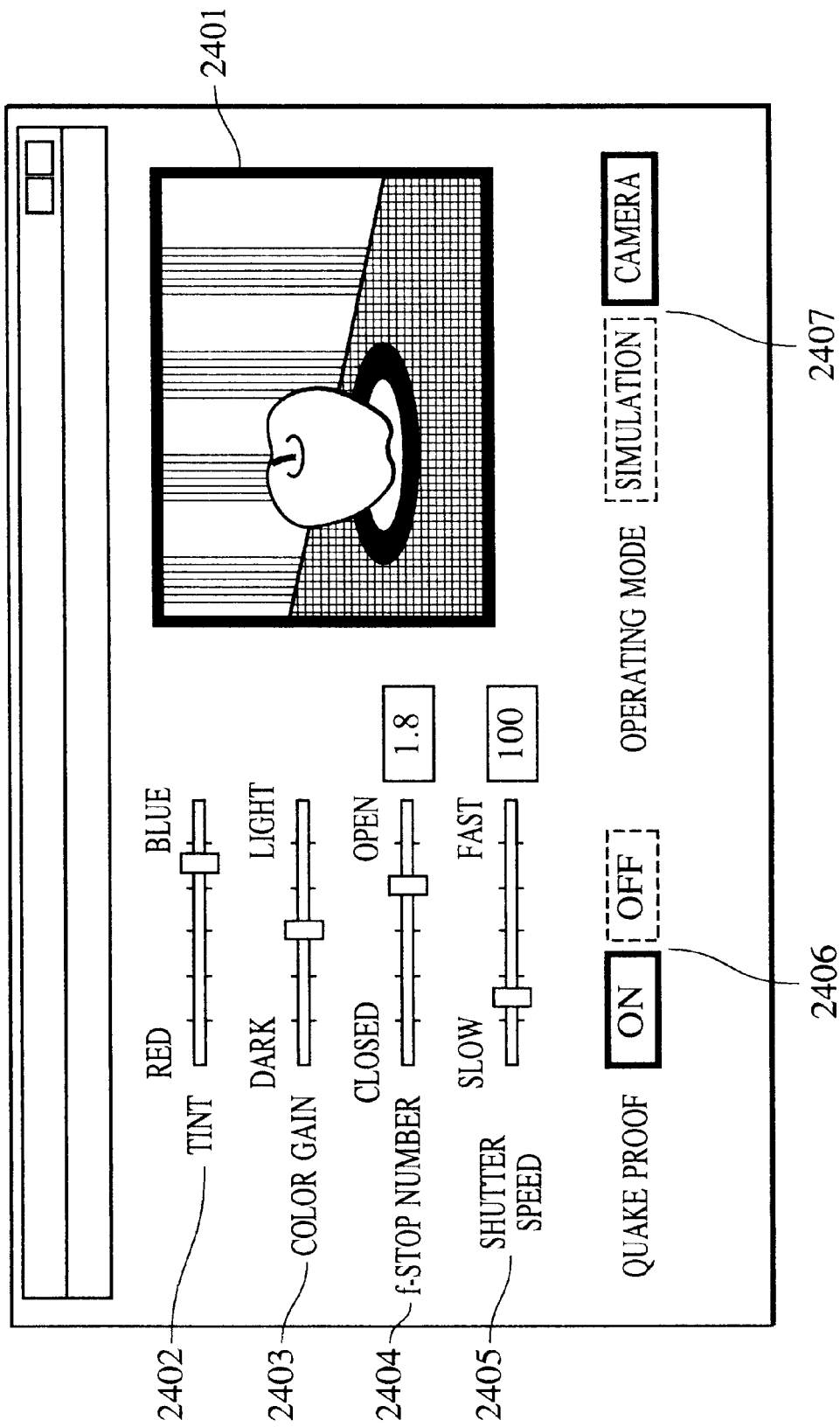
FIG. 24 shows screen display 1 in the related art.
Figure 25:
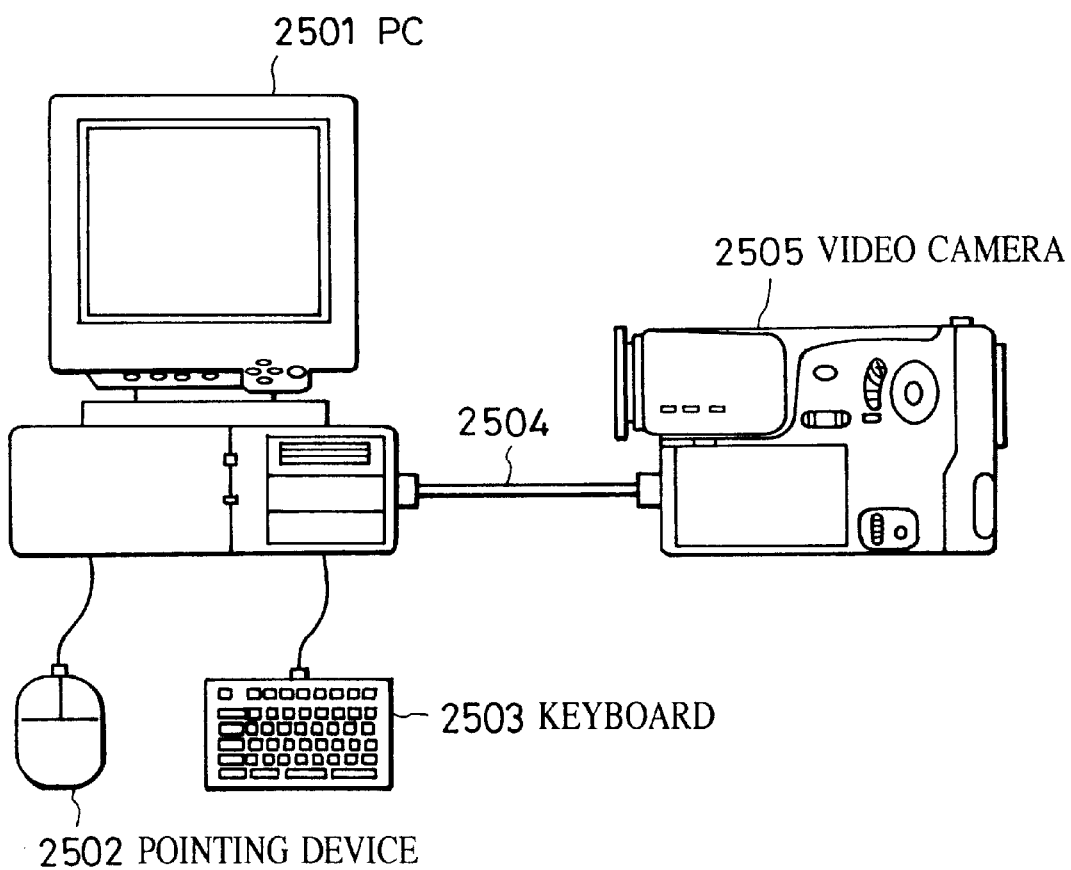
FIG. 25 shows a PC and a video camera connected to each other in the related art.
Figure 26:
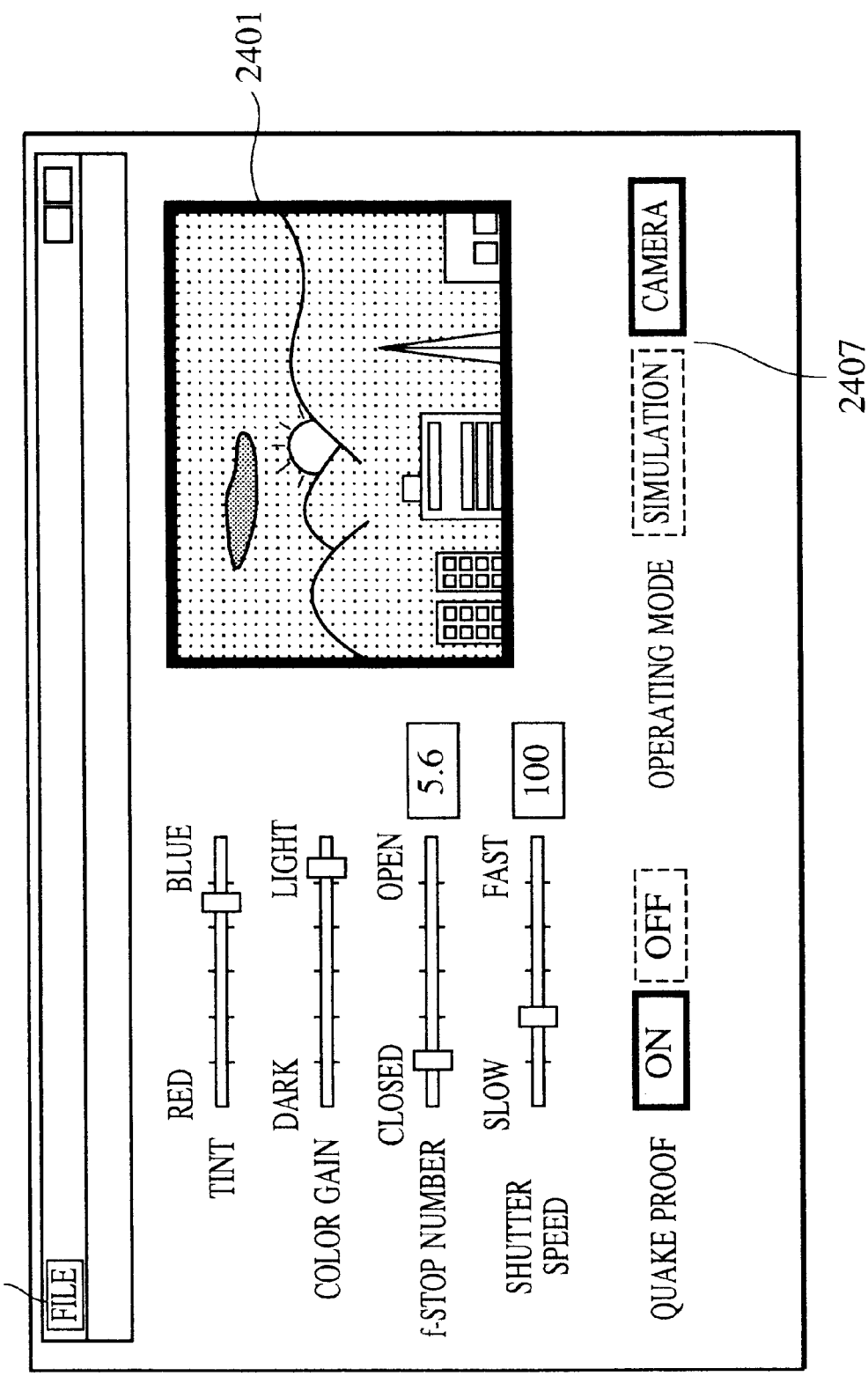
FIG. 26 shows screen display 2 in the related art.
Figure 27:
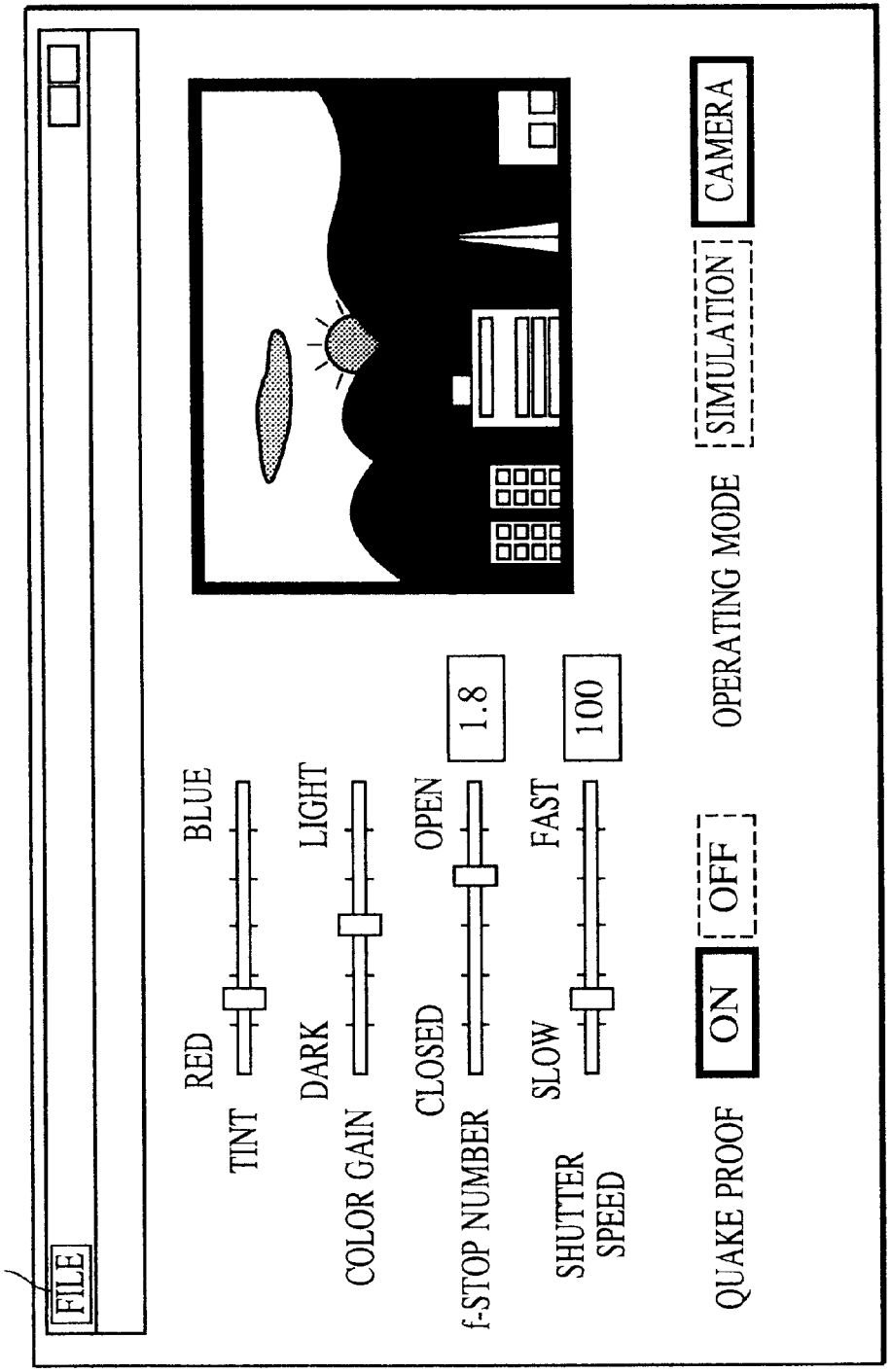
FIG. 27 shows screen display 3 in the related art.

The operation of a camera setting application on the PC side in the first embodiment will be described below in more detail with reference to a flowchart of FIG. 2. The camera setting application presents the same screen display as shown in FIG. 24.

Also, as described above in connection with the related art, a simulation mode in this embodiment means a mode in which the user can change the camera setting parameters in the PC even with the PC not connected to the video camera, and can confirm an image resulted from the parameter change on the monitor screen. Further, a camera mode in this embodiment means a mode in which the user can actually change the camera setting parameters in the video camera with the video camera connected to the PC, while confirming an image transmitted from the video camera, thereby optimizing the image. By manipulating an operating mode select button 2407 on the screen with the pointing device or the like through the user operating panel 111, the camera setting application can be switched over between the simulation mode and the camera mode at the user's discretion.

Upon start-up of the camera setting application, a program is first started in the simulation mode in step S1201.

Then, it is checked in step S1202 whether the mode is switched over to the camera mode. If not switched over, the control unit enters a simulation mode process in step S1207. In the simulation mode process, the control unit executes such operations as receiving an input from the user operating panel 111, outputting a command to the image processing unit 115 corresponding to a changed one of the camera setting parameters 113, controlling the image display unit 116 to switch over the monitor screen, and storing the camera setting parameters 113 in the hard disk 114 in the form of a file.

At a breakpoint during the simulation mode process, it is checked again in step S1208 whether the mode is switched over to the camera mode. If not switched over, the simulation mode process is resumed in step S1207.

If switched over, it is checked in step S1203 whether the video camera is connected, by referring to the connection detector 110. If not connected, the control unit returns to step S1202 again to repeat a loop process while it is on standby for the next operation.

If connected, one or more of the camera setting parameters 113 (which have been changed by simulation) are outputted in step S1204 from the digital interface 109, thereby changing the corresponding camera setting parameters in the video camera connected to the PC. In other words, a data match is established between the PC and the video camera connected to the PC at the time when the video camera is initially connected. Then, a step S1205 a camera adjustment process is executed with the matched state being as an initial state.

In the camera adjustment process, the control unit executes such operations as receiving an input from the user operating panel 111, outputting a parameter and a command from the digital interface 109 corresponding to changed one of the camera setting parameters 113, displaying a screen of the image data transmitted from the video camera, and storing the camera setting parameters 113 in the hard disk 114 in the form of a file. At a breakpoint during the camera adjustment process, it is checked again in step S1206 whether the mode is switched over to the simulation mode. If not switched over, the control unit returns to step S1205 again to resume the camera adjustment process, and if switched over, it goes to step S1207 for shift to the simulation process.

With the control procedures described above, a data match between the PC and the video camera can be obtained in an initial condition where the camera is connected to the PC. It is therefore possible to avoid such trouble as causing a contradiction in the subsequent process.

Second Embodiment

Figure 3:
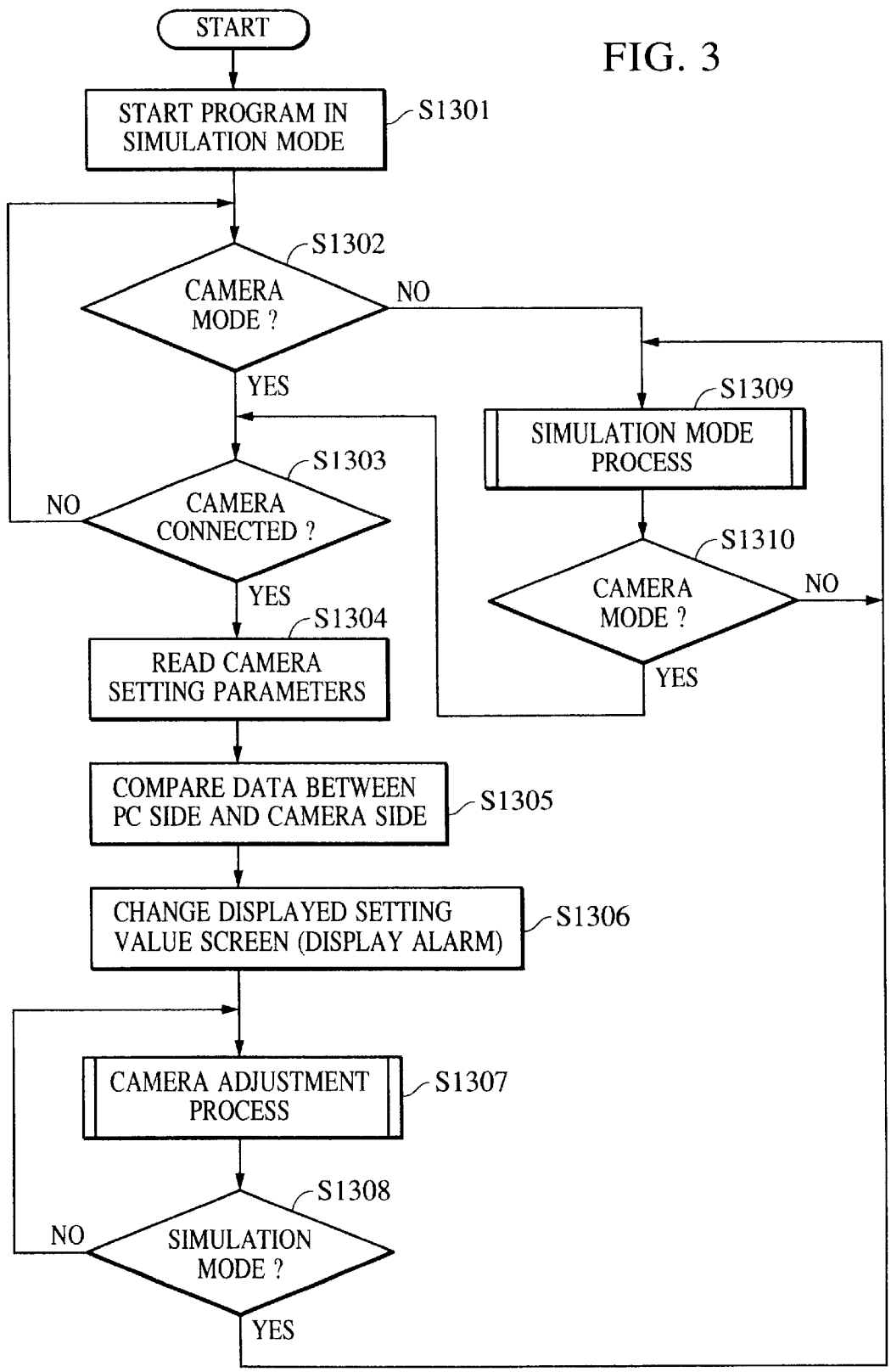
FIG. 3 is a flowchart for explaining a second embodiment.
Figure 4:
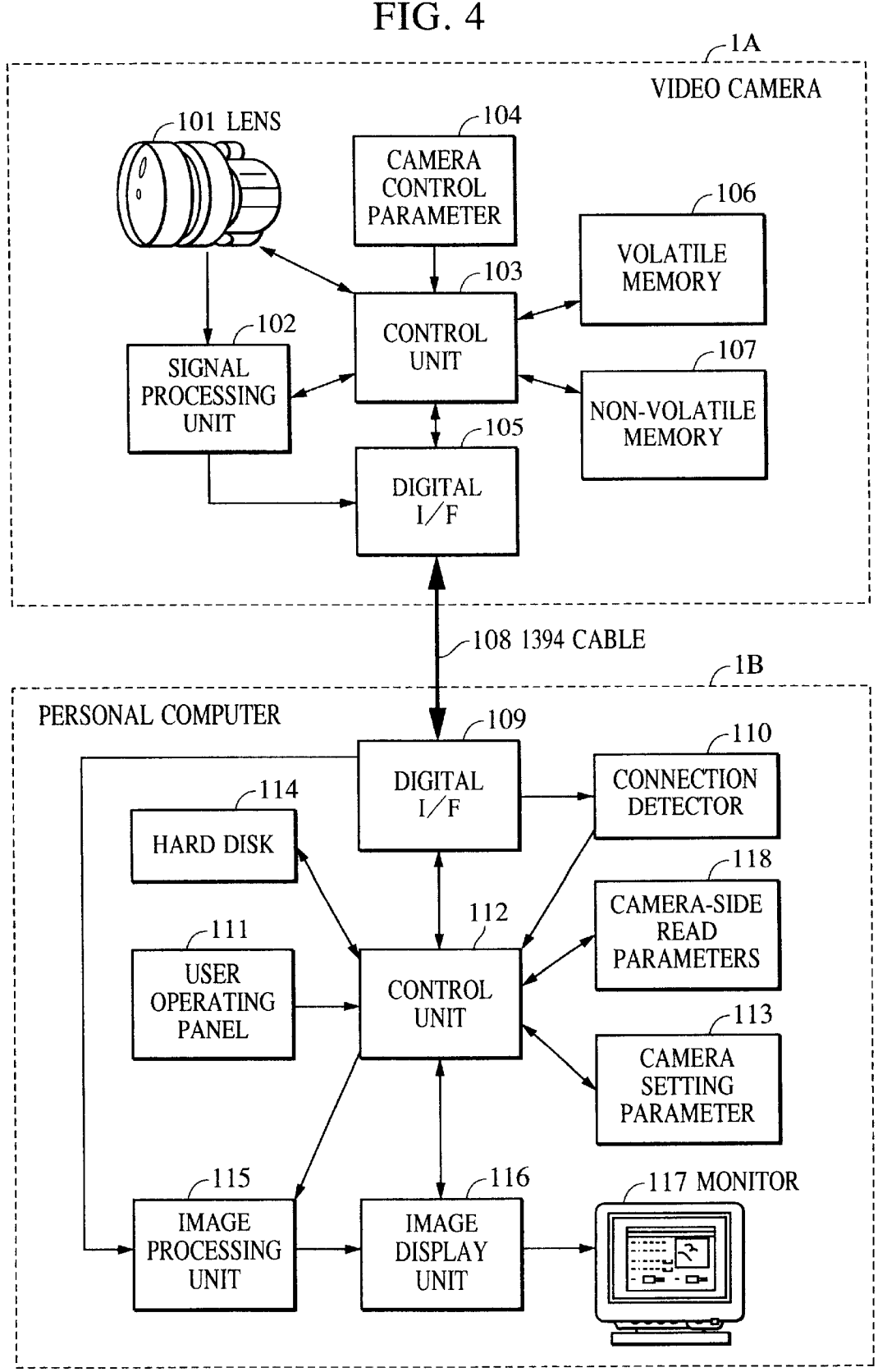
FIG. 4 is a block diagram showing a configuration of the second embodiment.

FIG. 3 is a flowchart of a camera setting application for explaining the second embodiment of the present invention. The control shown in FIG. 3 is executed with a configuration shown in a block diagram of FIG. 4. The second embodiment will be described below with reference to FIGS. 3 and 4.

Upon start-up of the camera setting application, a program is first started in the simulation mode in step S1301.

Then, it is checked in step S1302 whether the mode is switched over to the camera mode. If not switched over, the control unit enters a simulation mode process in step S1309. In the simulation mode process, the control unit executes such operations as receiving an input from the user operating panel 111, outputting a command to the image processing unit 115 corresponding to a changed one of the camera setting parameters 113, controlling the image display unit 116 to switch over the monitor screen, and storing the camera setting parameters 113 in the hard disk 114 in the form of a file.

At a breakpoint during the simulation mode process, it is checked again in step S1310 whether the mode is switched over to the camera mode. If not switched over, the simulation mode process is resumed in step S1309.

If switched over, it is checked in step S1303 whether the video camera is connected, by referring to the connection detector 110. If not connected, the control unit returns to step S1302 again to repeat a loop process while it is on standby for the next operation. The processing so far described is exactly the same as in the first embodiment.

If it is detected in step S1303 that the video camera is connected, the control unit 112 issues a command to read the camera setting parameters, such as tint, color gain, f-stop number and shutter speed, to the video camera via the digital interface 109. Upon receiving the command, the control unit 103 in the video camera read requests one or more of the camera setting parameters from the volatile memory 106 or the non-volatile memory 107, and transmits the read data to the PC via the digital interface 105. Through the above procedures, the control unit 112 on the PC side reads the above parameters in the video camera connected to the PC, and then stores them as camera-side read parameters 118 on the PC side.

Next, in step S1305, the control unit 112 compares the camera-side read parameters 118 and the camera setting parameters 113 currently existing in the PC. Depending on a compared result, in step S1306, the control unit 112 displays the camera setting parameters on a screen image of the camera setting application. Specifically, if the compared result shows a discrepancy in data values between the video camera and the PC, the control unit 112 issues an alarm.

Figure 5:
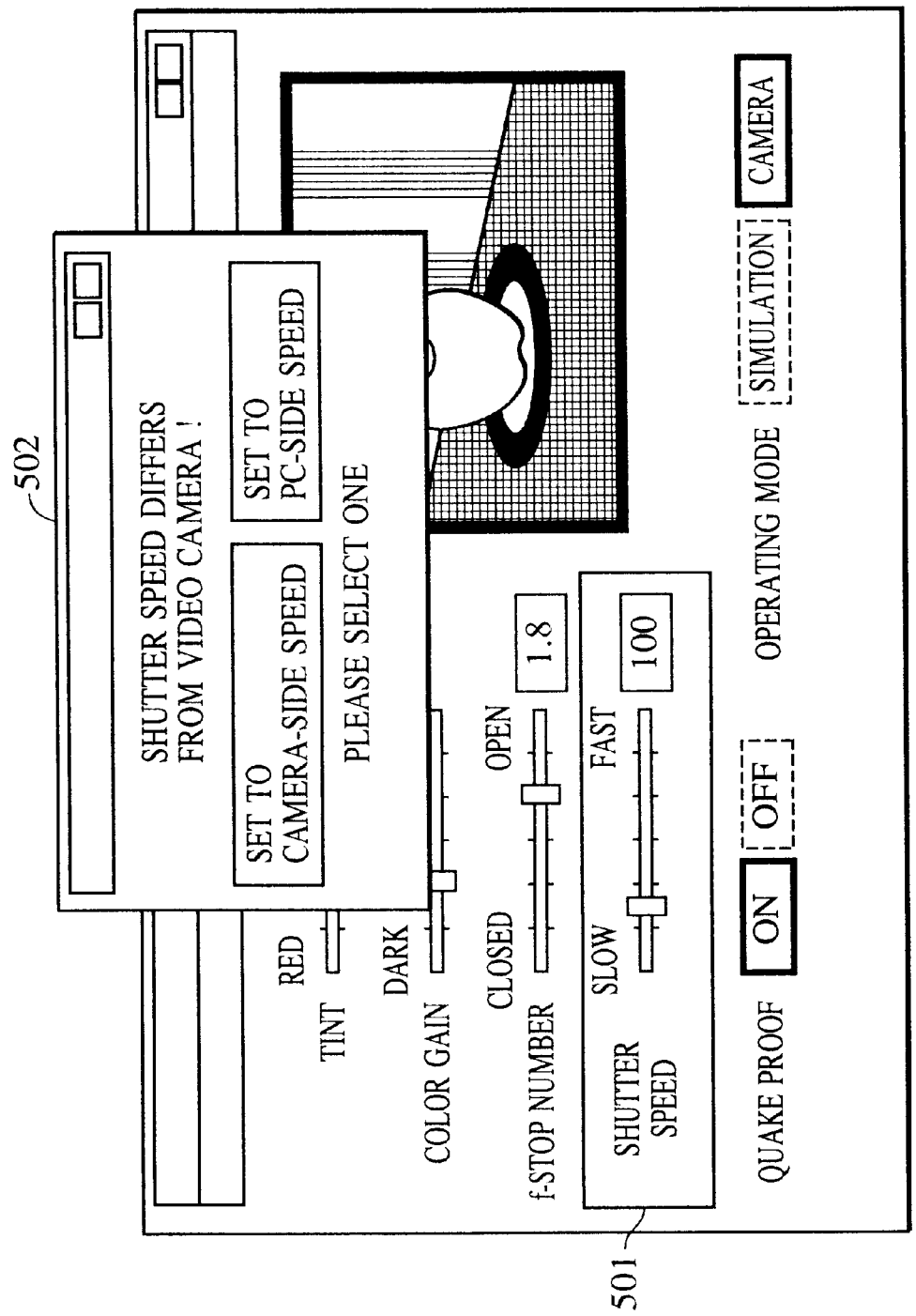
FIG. 5 shows a screen display in the second embodiment.

FIG. 5 shows a screen image of the camera setting application which includes an alarm display produced through the above-described procedures. The screen image of FIG. 5 illustrates an example in which the shutter speed value differs between the video camera and the PC. In this case, the shutter speed display is highlighted as indicated by 501. Furthermore, in this embodiment, a subwindow 502 for prompting the user to select a subsequent process is additionally displayed.

After that, the control unit 112 enters a camera adjustment process in a step S1307. If the alarm display described above is produced, the control unit 112 receives an input from the user. In other words, the user selects one of two buttons on the subwindow 502 by using the user operating panel 111 in the form of, e.g., a pointing device, thereby deciding with which data two different data should be matched.

If the button indicating "SET TO CAMERA SIDE SPEED" is selected, the control unit 112 rewrites a corresponding one of the camera setting parameters 113 to the value of the corresponding camera-side read parameter 118. Conversely, if the button indicating "SET TO PC SIDE SPEED" is selected, the control unit 112 rewrites a corresponding one of the camera-side read parameters 118 to the value of the corresponding camera setting parameter 113, and also outputs that camera setting parameter 113 through the digital interface 109 for changing the corresponding camera-side read parameter in the video camera connected to the PC. As a result, a data match is established between the PC and the video camera connected to the PC at the time when the video camera is initially connected.

Third Embodiment

This third embodiment intends to achieve the above-described data match when a plurality of devices are connected to a network according to one feature of the 1394 serial bus connection. This point will be described below.

Figure 6:
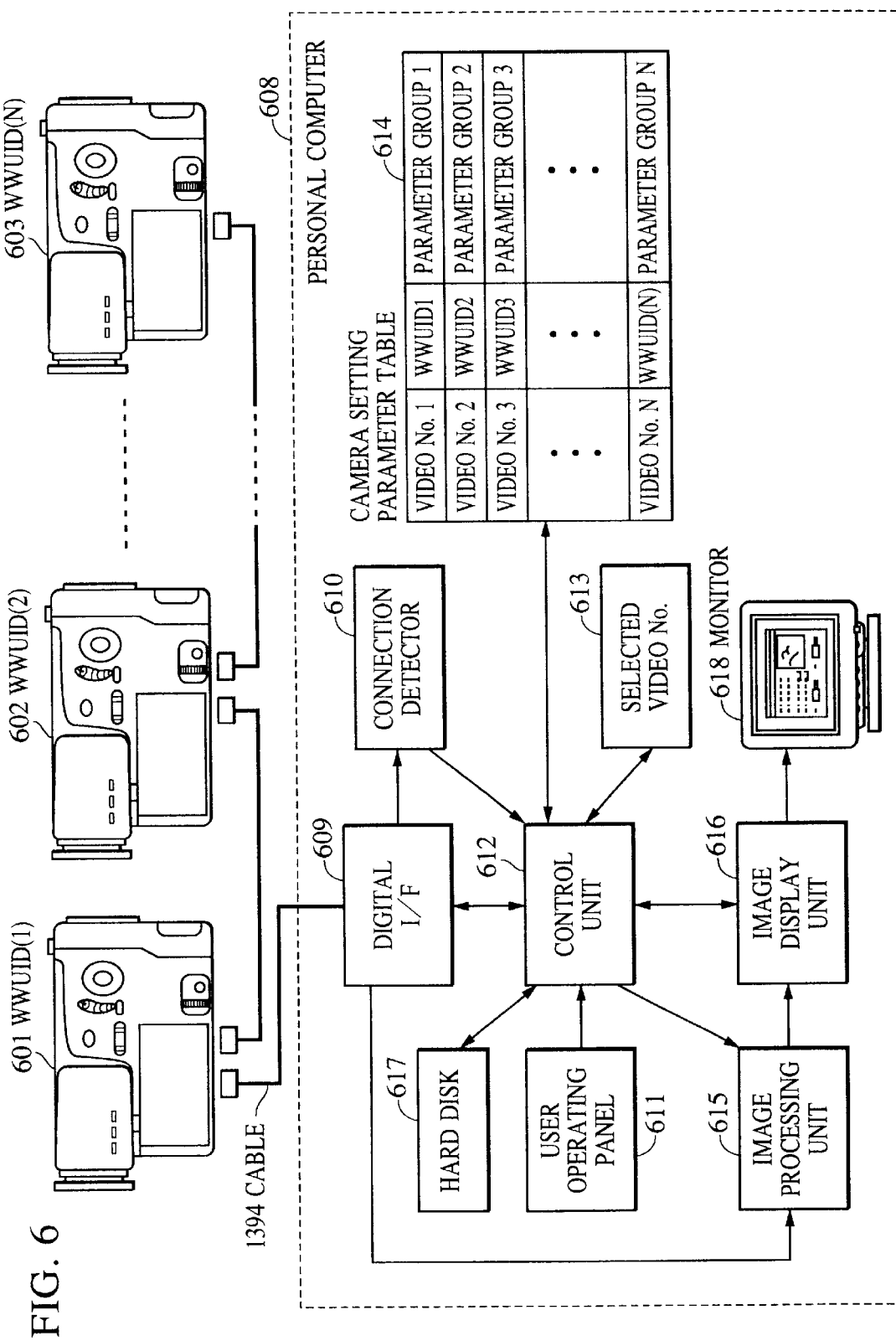
FIG. 6 is a block diagram showing a configuration of a third embodiment.
Figure 7:
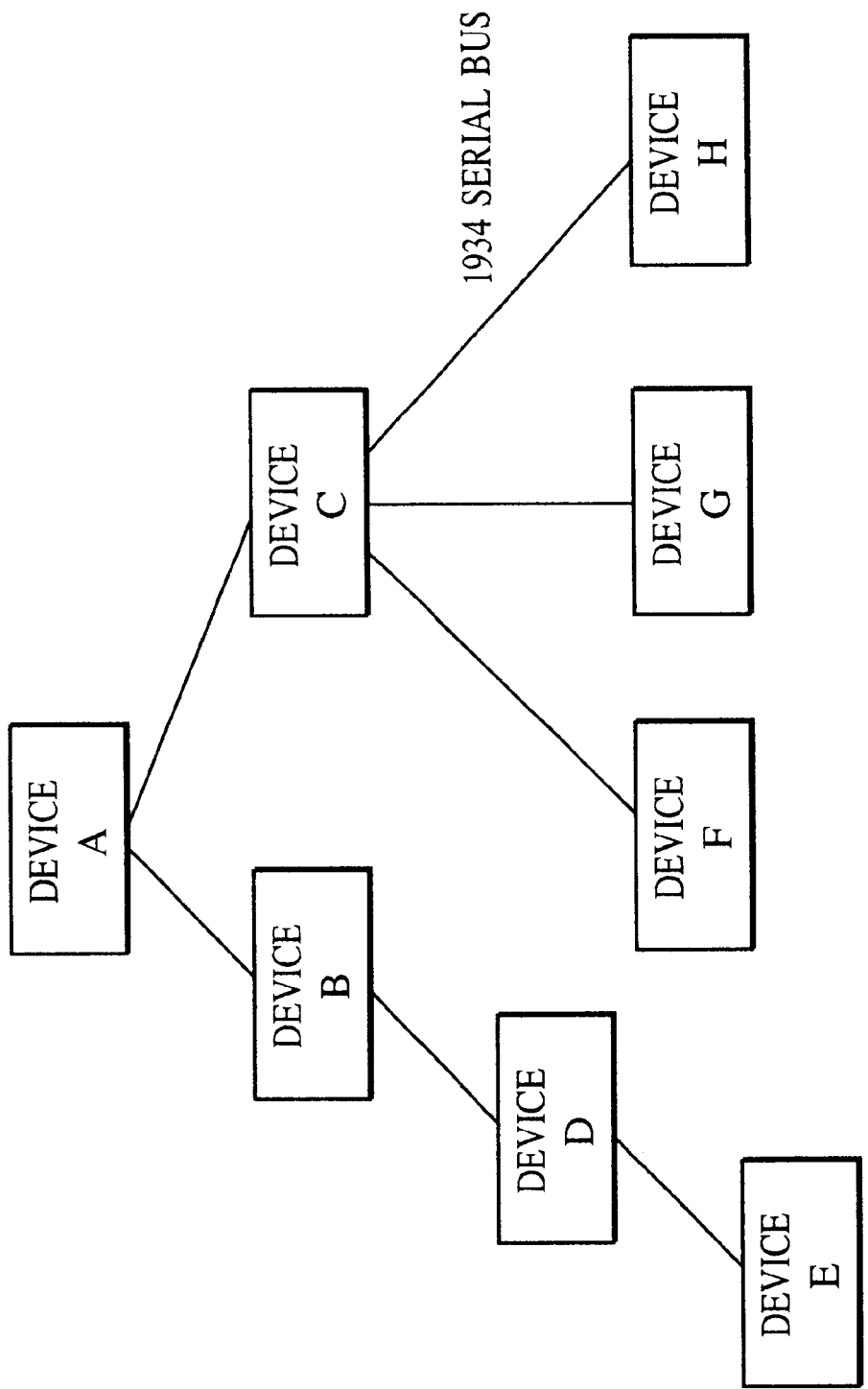
FIG. 7 is a diagram showing one example of a network system constructed by using 1394 serial buses (in conformity with IEEE 1394).
Figure 8:
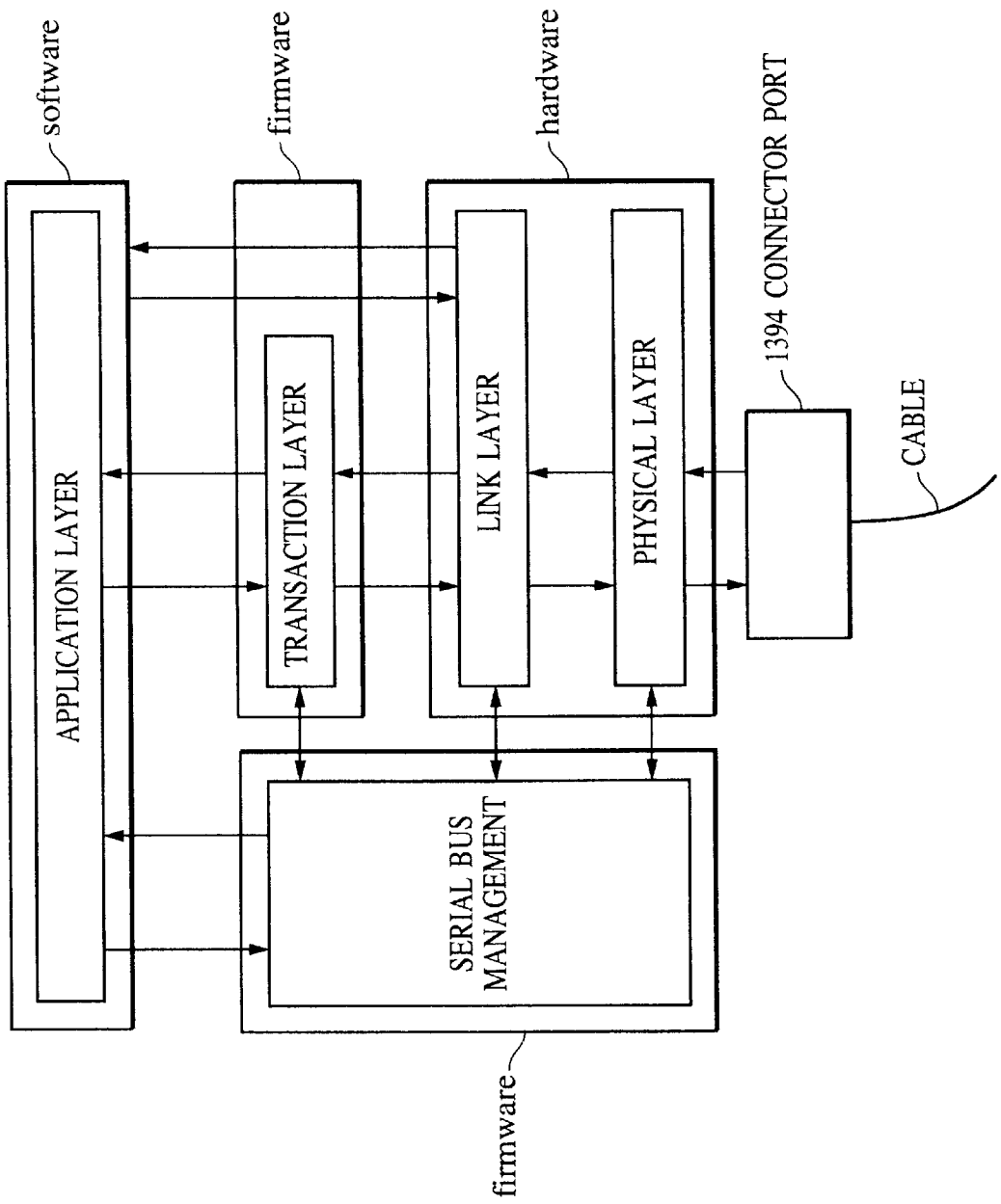
FIG. 8 is a diagram showing components of the 1394 serial bus (in conformity with IEEE 1394).
Figure 9:
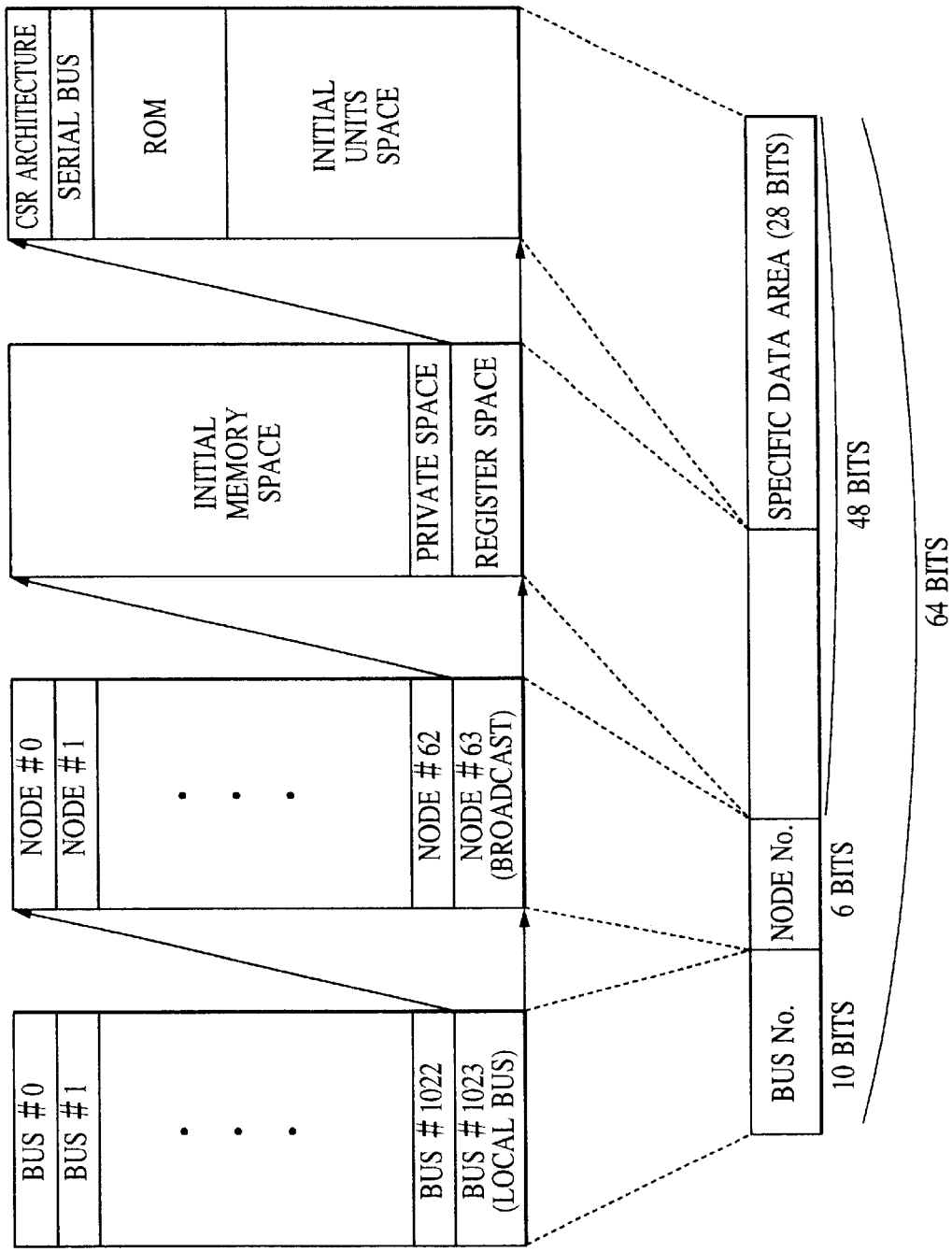
FIG. 9 is a diagram showing an address space in the 1394 serial bus (in conformity with IEEE 1394).
Figure 10:
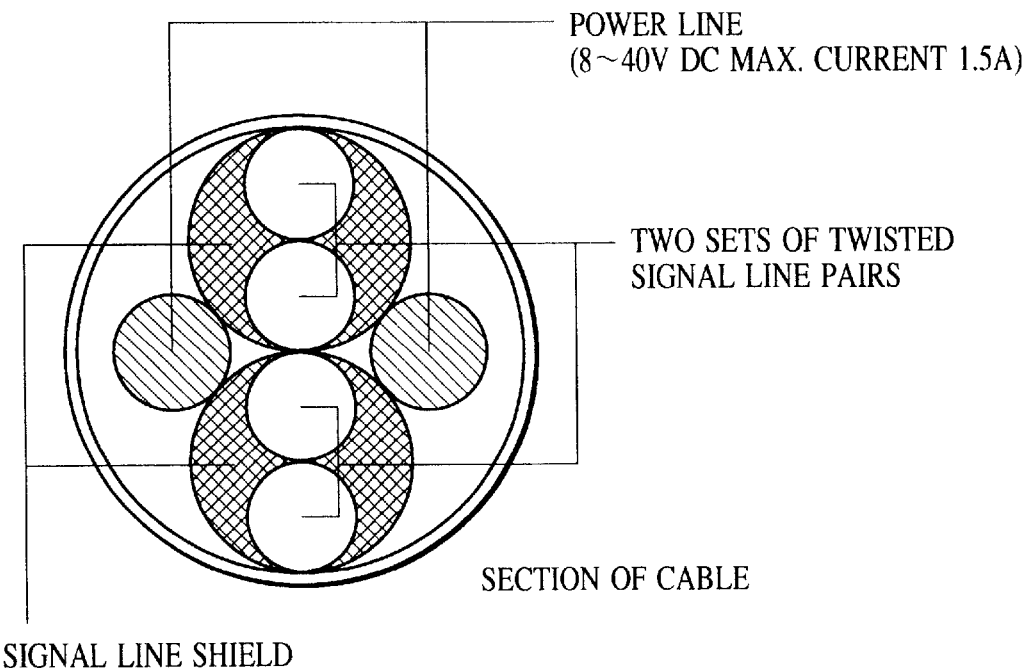
FIG. 10 is a sectional view of a 1394 serial bus cable.
Figure 11:
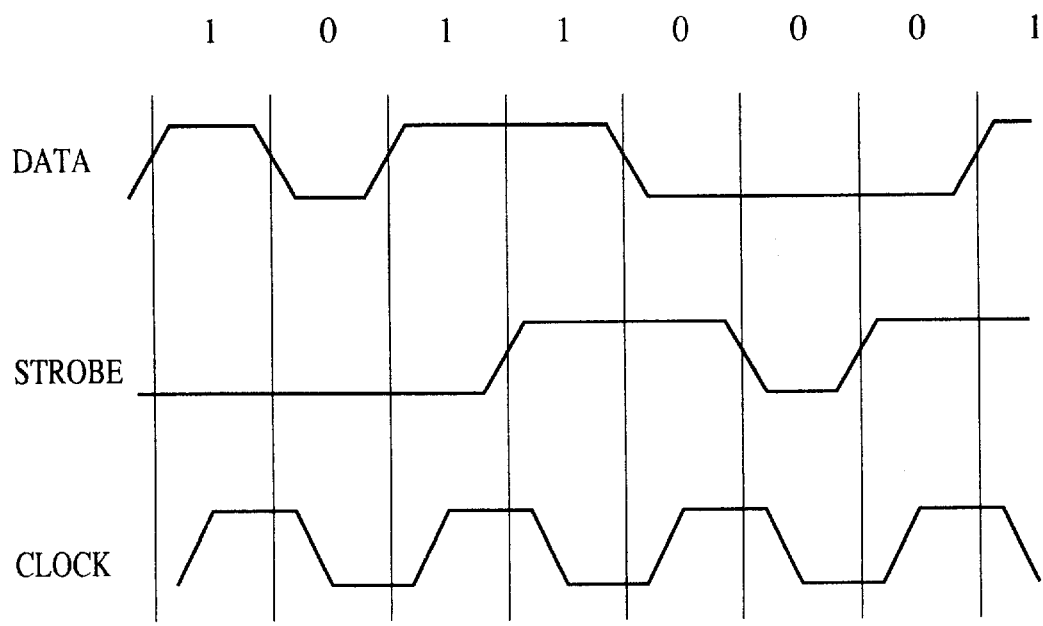
FIG. 11 is a chart for explaining a DS-Link coding method for a data transfer format (in conformity with IEEE 1394).
Figure 12:
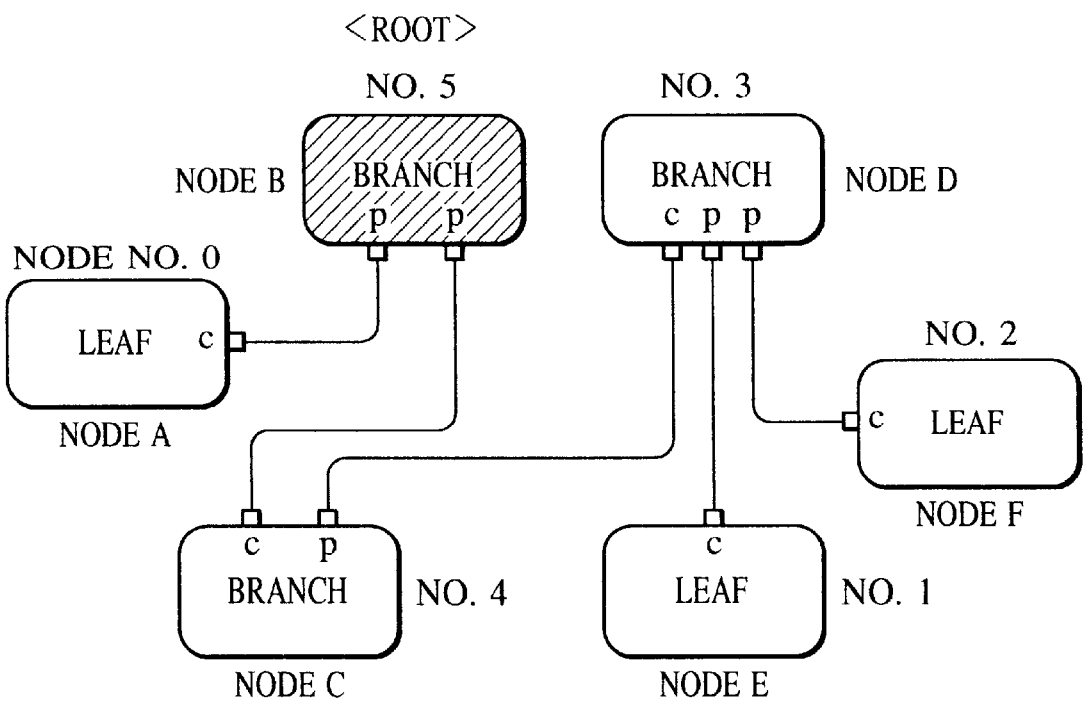
FIG. 12 is a diagram showing one example of an actual network (in conformity with IEEE 1394).
Figure 13A:
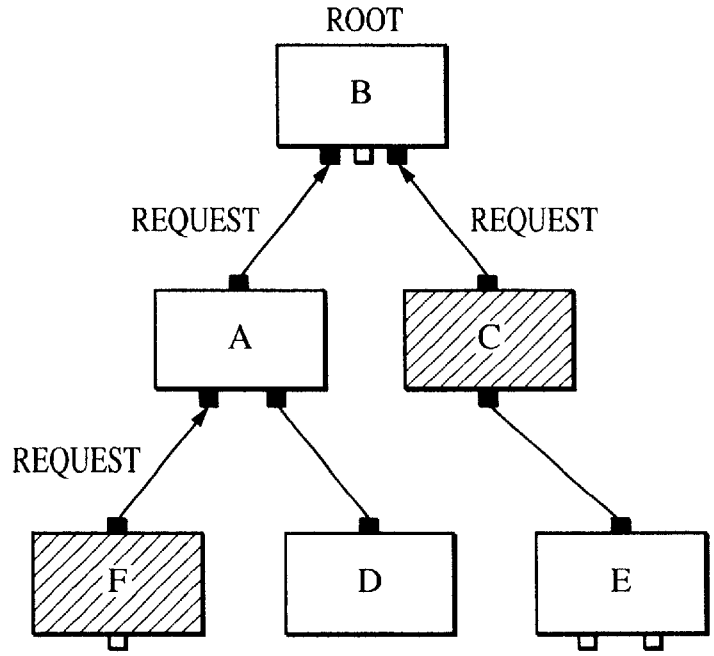
FIGS. 13A and 13B are diagrams for explaining processes of requesting the use of the bus and permitting the use of the bus.
Figure 13B:
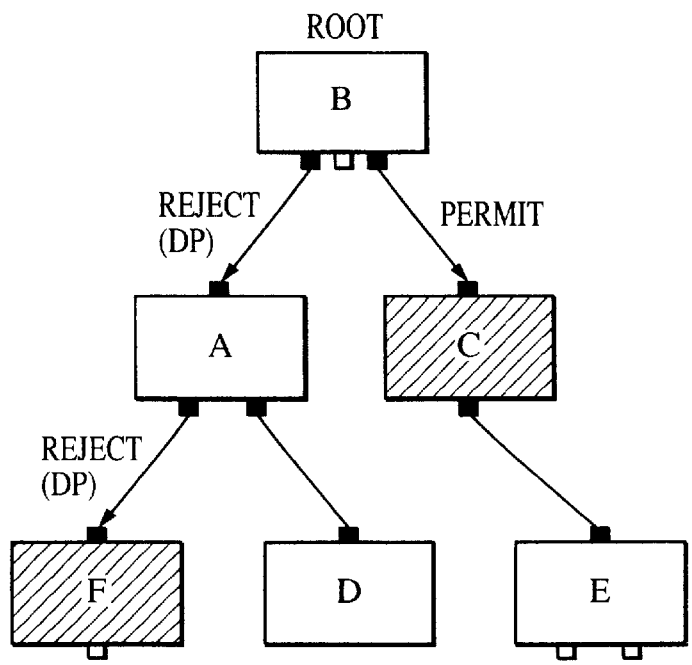
Figure 14:
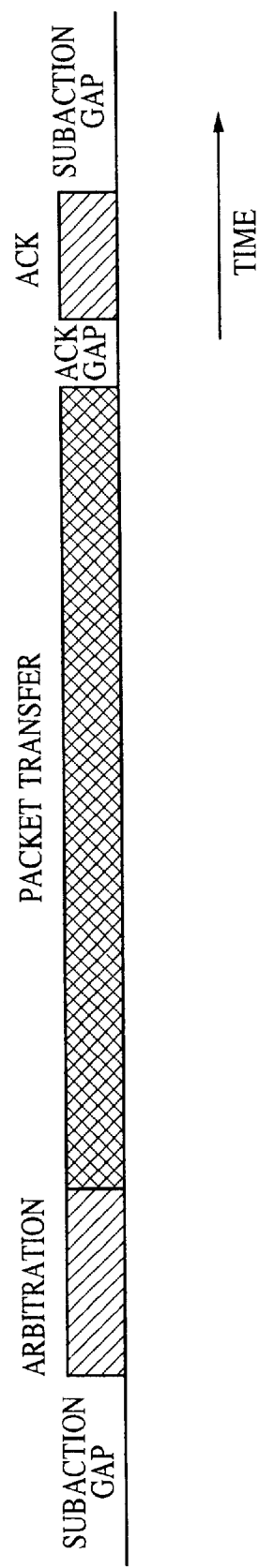
FIG. 14 is a chart showing state transition over time during asynchronous transfer (in conformity with IEEE 1394).
Figure 15:
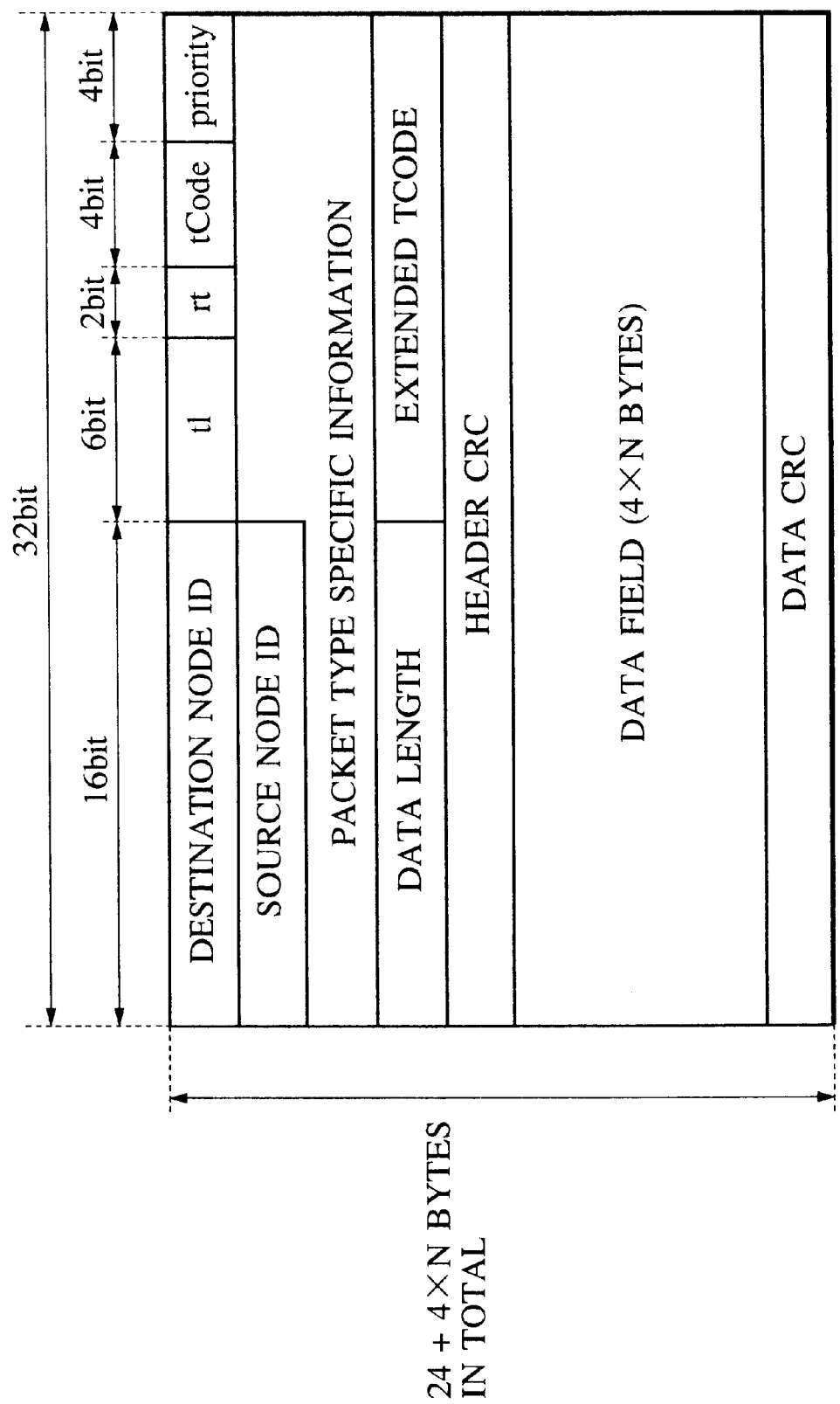
FIG. 15 shows an example of a packet format for use in the asynchronous transfer mode(in conformity with IEEE 1394).
Figure 16:
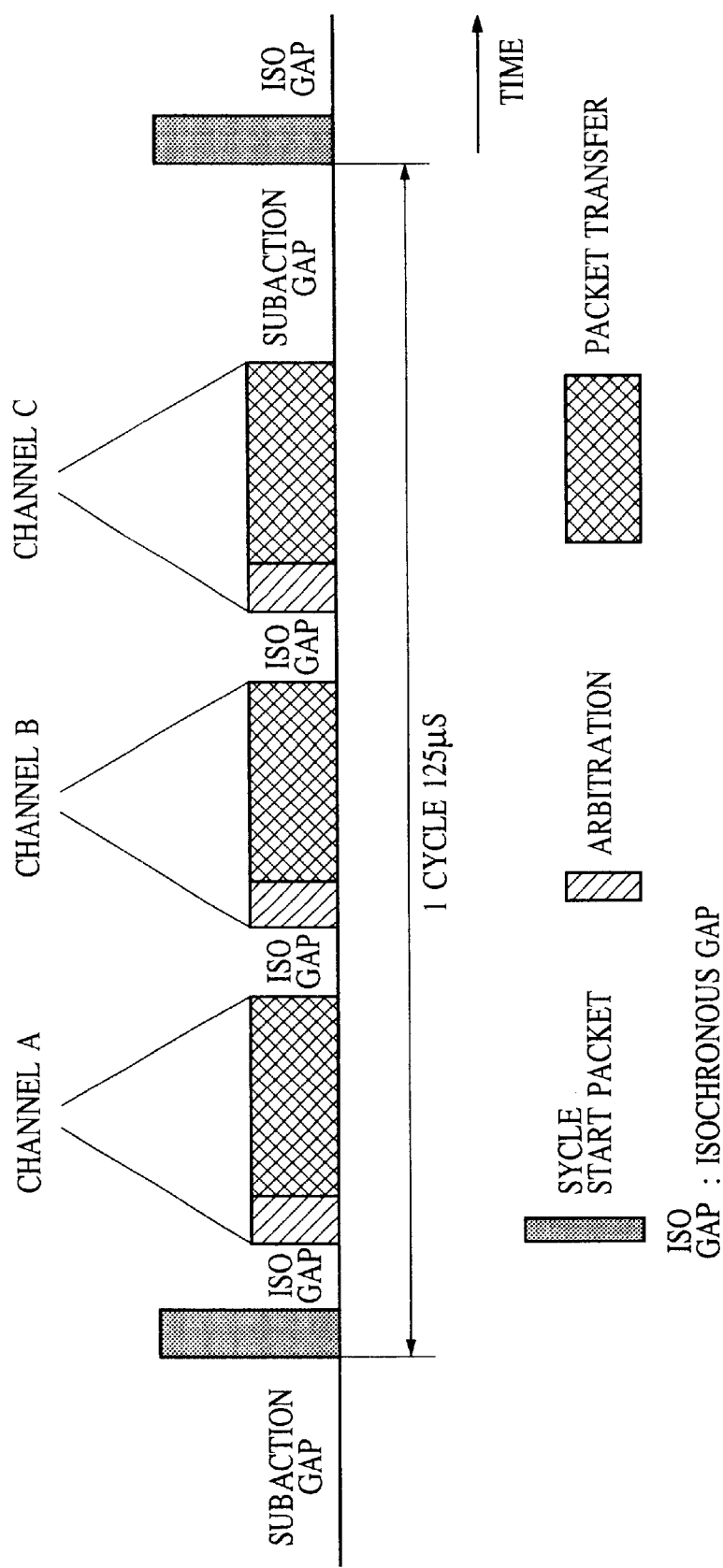
FIG. 16 is a chart showing state transition over time during isochronous transfer (in conformity with IEEE 1394).
Figure 17:
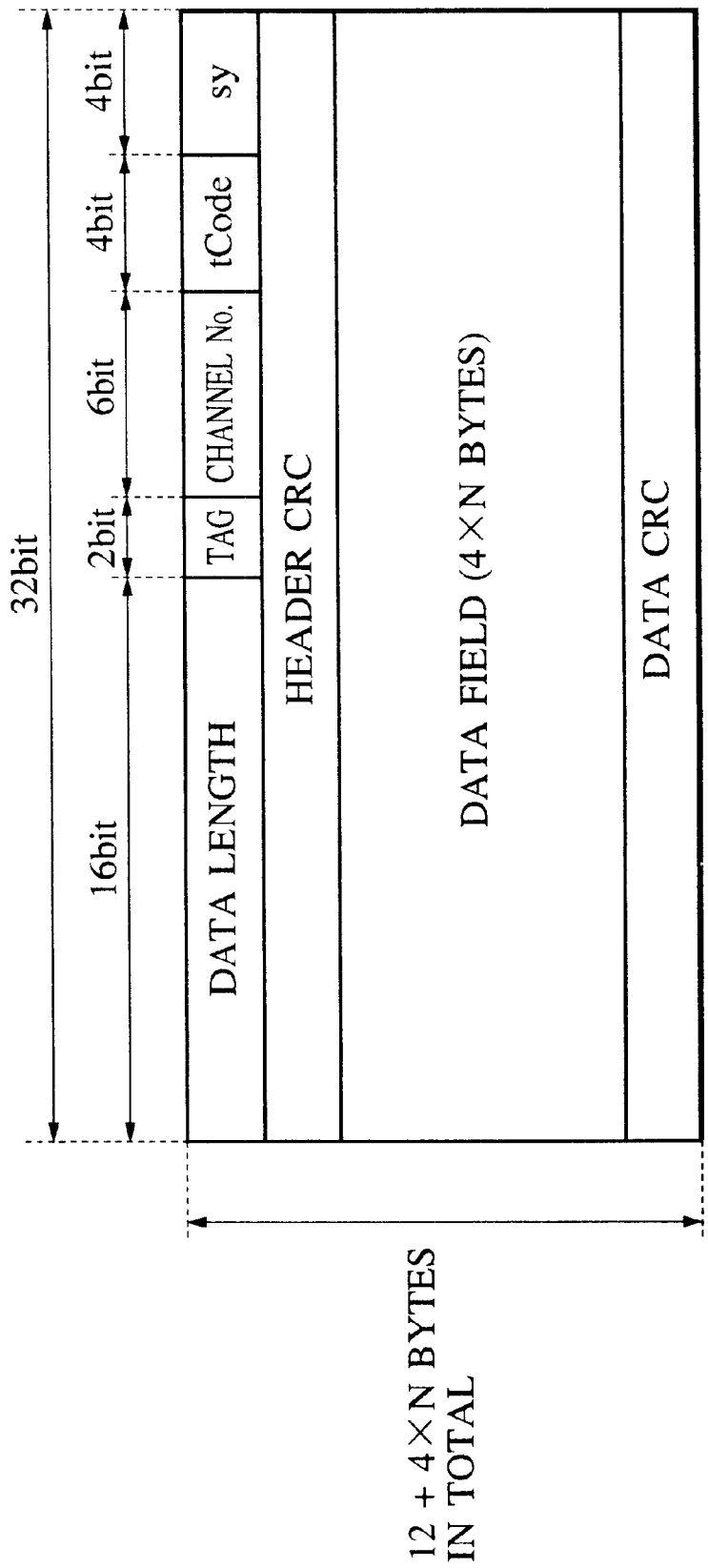
FIG. 17 shows an example of a packet format for use in the isochronous transfer mode (in conformity with IEEE 1394).
Figure 18:
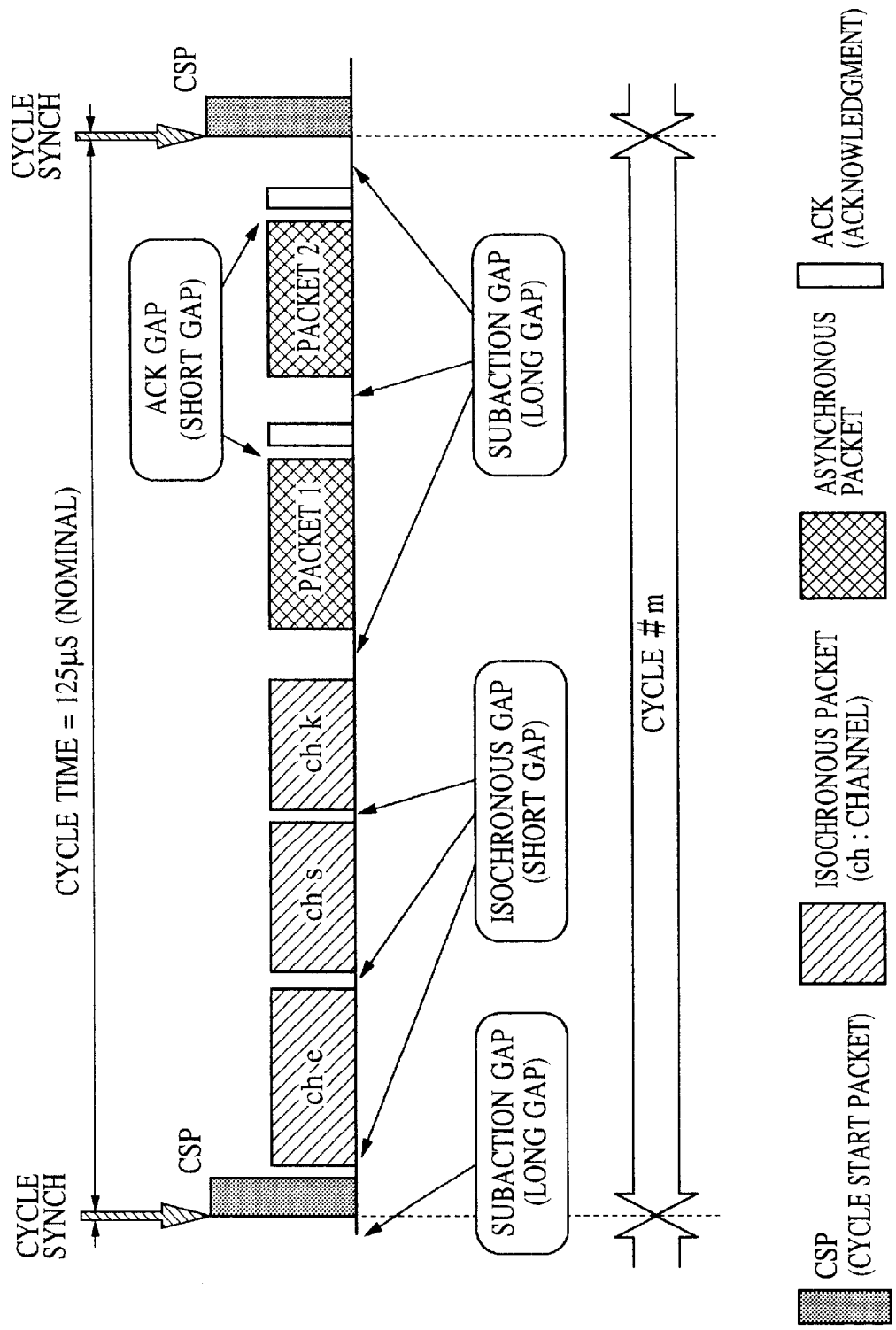
FIG. 18 is a chart showing transfer state transition on the bus over time when an isochronous transfer and an asynchronous transfer are executed in mixed fashion (in conformity with IEEE 1394).
Figure 19:
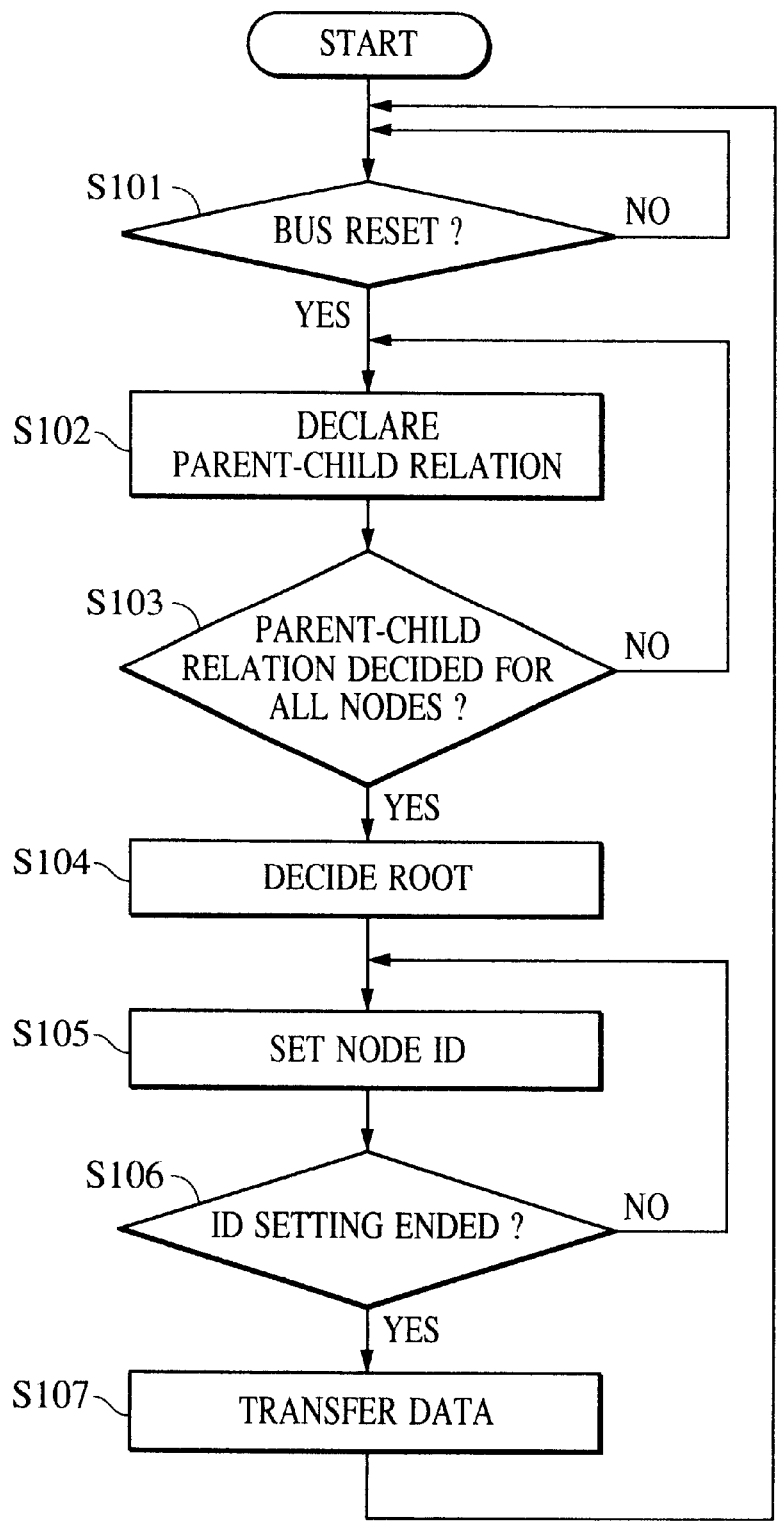
FIG. 19 is a flowchart showing a general sequence 1 from a bus reset to a decision of node IDs (in conformity with IEEE 1394).

FIG. 6 is a block diagram showing a configuration of the third embodiment. Numerals 601 to 603 denote video cameras connected by the 1394 serial buses, and 608 denotes a PC for setting parameters of the video cameras.

As described above in connection with the related art, the video cameras 601 to 603 are internally given WWUID(1) to WWUID(N) as IDs which are used in the 1394 serial bus network and specific to the respective cameras. The PC 608 can read the WWUIDs via the 1394 serial buses, and conversely can perform such operations as receiving image information from only one of the video cameras having the particular WWUID, and producing a camera parameter setting command to the video cameras having the particular WWUID.

A camera setting application in this embodiment can hold camera setting parameters for a plurality of video cameras, and also can select a particular one of the plurality of video cameras connected to the network by utilizing the specific WWUID so that camera parameters of the selected one video camera may be set separately.

Details of the camera setting application executed in the PC 608 according to this embodiment will be described.

Numeral 609 denotes a 1394 digital interface, and 610 denotes a connection detector receiving a particular WWUID from the control unit 612 and detecting whether the video camera having particular WWUID is connected to the network. Numeral 611 denotes a user operating panel for operating the camera setting application, such as selecting the video camera and changing the camera setting parameters. Numeral 612 denotes a control unit for controlling the entirety of the application system, and denotes a selected VIDEO No. memory for storing the video camera number selected from the user operating panel 611. Numeral 614 denotes a camera setting parameter table for holding WWUIDs corresponding to the VIDEO Nos. and camera setting parameter groups for the corresponding video cameras. Numeral 615 denotes an image processing unit which includes an image memory for storing digital image information inputted from the video camera corresponding to the selected VIDEO No. via the digital interface 109, and which can apply a digital effect to the image in the memory upon receiving a command from the control unit 612. Numeral 616 denotes an image display unit for producing a window display image based on the digital image information outputted from the image processing unit 615 and the camera setting parameters, and outputting the produced image to a monitor 617. Numeral 617 denotes a hard disk for storing the camera setting parameters in the form of a file along with the WWUID of the selected video camera.

Processing steps executed by the control unit 612 in the camera setting application will be described below with reference to a flowchart of FIG. 29.

First, in step S2901, the camera setting application starts a program in the camera mode.

Then, in step S2902, the control unit 612 reads a camera setting parameter file stored beforehand, and develops read data in the camera setting parameter table 614.

The user now has to select from the user operating panel 611 which one of read data (i.e., which one of the video cameras) is to be set. In step S2903, therefore, the control unit 612 waits for a camera selection input from the user.

If the camera selection input is applied, processing goes to step S2904 to store the VIDEO No. of the selected video camera in the selected VIDEO No. memory 613.

After the VIDEO No. has been decided, the control unit 612 can select a particular one of the video cameras externally connected by the 1394 serial buses by referring to the WWUID corresponding to the decided VIDEO No. in the camera setting parameter table 614.

Then, the control unit 612 transmits the WWUID selected in step S2905 to the connection detector 610 to detect whether the video camera having the selected WWUID is connected to the 1394 serial bus network.

If not connected, the control unit 612 repeats a loop process while it is on standby for the next operation. If connected, the control unit 612 outputs in step S2906 the camera setting parameters, which are stored in the camera setting parameter table 614 and correspond to the selected VIDEO No., to the video camera having the selected WWUID from the digital interface 609. After that, the control unit 612 enters step S2907 for a camera adjustment process, described above in connection with the related art, with a resultant state being as an initial state.

By outputting to the camera side one or more of the camera setting parameters, which are possibly changed by simulation, etc. on the PC side, after the connection of the selected video camera has been detected through the above-described procedures, a data match is established between the PC and the selected video camera connected to the PC at the time when the video camera is initially connected.

Tough not described here in detail, after the connection of the selected video camera detected in step S2905 of FIG. 29, values of the camera setting parameters in the selected video camera may be read and the read data may be used as first display data in the camera setting application as with the second embodiment. In this case, it is of course possible to compare the parameters read from the video camera with the camera setting parameters which are stored in the camera setting parameter table 614 and correspond to the selected VIDEO No., and to produce an alarm display in a manner like the second embodiment if the compared data differ from each other.

Other Embodiments

It is needless to say that the object of the present invention can also be achieved by supplying, to a system or apparatus, a storage medium which stores program codes of software for realizing the functions of any of the above-described embodiments, and causing a computer (or CPU and/or MPU) in the system or apparatus to read and execute the program codes stored in the storage medium.

In such a case, the program codes read out of the storage medium serve in themselves to realize the functions of any of the above-described embodiments, and hence the storage medium storing the program codes comprises the present invention.

Storage mediums for use in supplying the program codes may be, e.g., floppy disks, hard disks, optical disks, magneto-optic disks, CD-ROMs, CD-Rs, magnetic tapes, nonvolatile memory cards, and ROMS.

Also, it is a matter of course that the functions of any of the above-described embodiments is realized by not only a computer reading and executing the program codes, but also an OS (Operating System) or the like which is working on the computer and executes part or whole of the actual process to realize the functions in accordance with instructions from the program codes.

Further, it is a matter of course that the present invention involves such a case where the program codes read out of the storage medium are written into a memory provided in a function add-on board mounted in the computer or a function add-on unit connected to the computer, and a CPU or the like incorporated in the function add-on board or unit executes part or whole of the actual process in accordance with instructions from the program codes, thereby realizing the function of any of the above-described embodiments.

It should be understood that the present invention is also applicable to various alterations or modifications of the above-described embodiments without departing from the scope of the invention.

For example, while a video camera is employed as the imaging device in the above-described embodiments, the present invention is not limited to the embodiments, but also applicable to other types of imaging devices such as a digital camera, a silver salt camera, and a scanner.

While data is transmitted from the control device side to the imaging device side in the above-described embodiments, data may be transmitted from the imaging device side to the control device side in a reverse direction.

According to the present invention, as described above, in a camera setting system comprising a control device such as a PC and a video camera which are connected to each other, a mismatch between setting values on the PC side and camera setting values in the video camera which occurred immediately after the connection therebetween can be automatically avoided immediately after the PC and the video camera are connected again.

Also, in a camera setting system wherein a control device, such as a PC, and a video camera are connected to each other, particularly in a camera setting system having a simulation function, a mismatch between setting values on the PC side, which have been changed upon execution of a simulation, and unchanged setting values in the video camera can be automatically avoided immediately after the PC and the video camera are connected again.

Further, in a camera setting system wherein a control device, such as a PC, and a plurality of video cameras are connected to each other, a mismatch between setting values on the PC side, which correspond to a particular one of the video cameras, and camera setting values in the particular video camera immediately after the connection therebetween can be avoided.

Further, in a camera setting system wherein a control device, such as a PC, and a plurality of video cameras are connected to each other, particularly in a camera setting system having a simulation function, a mismatch between setting values on the PC side, which have been changed upon execution of the simulation, and unchanged setting values in a particular one of the video cameras can be automatically avoided immediately after the PC and the particular video camera are connected again.

Further, in a camera setting system wherein a control device, such as a PC, and a plurality of video cameras are connected to each other, a particular one of the video cameras can be surely selected by utilizing IDs specific to the video cameras, and a mismatch between setting values on the PC side, which have been changed and correspond to the selected video camera, and camera setting values in the selected video camera can be automatically avoided.

Further, in a camera setting system wherein a control device, such as a PC, and a video camera are connected to each other, a mismatch between a display of setting values on the PC side and camera setting values in the video camera immediately after the connection therebetween can be avoided.

Further, in a camera setting system wherein a control device, such as a PC, and a plurality of video cameras are connected to each other, a mismatch between a display of setting values on the PC side, which correspond to a particular one of the video cameras, and camera setting values in the particular video camera immediately after the connection therebetween can be avoided.

Further, in a camera setting system wherein a control device, such as a PC, and a plurality of video cameras are connected to each other, a particular one of the video cameras can be surely selected by utilizing IDs specific to the video cameras, and a mismatch between a display of setting values on the PC side, which correspond to the particular video camera, and camera setting values in the selected video camera immediately after the connection therebetween can be avoided.

Further, when setting values on the PC side, which correspond to a particular video camera, differ from camera setting values in a selected video camera, an alarm display is produced.

What is claimed is:

1. An imaging system comprising:
    an imaging device including a first memory adapted to store a first control parameter for controlling the imaging device; and
    a control device including a second memory adapted to store a second control parameter for controlling the imaging device, and a controller adapted (i) to change the second control parameter regardless of whether the imaging device is connected with the control device, (ii) to query a user whether to match the first control parameter with the second control parameter if the first control parameter does not match the second control parameter, and (iii) to control the imaging device to match the first control parameter with the second control parameter if the user selects to match the first control parameter with the second control parameter.

2. An imaging system according to claim 1, wherein the control device further comprises a display adapted to display a value of the second control parameter and an image modified in accordance with the second control parameter.

3. An imaging system according to claim 1, wherein the first and second control parameters control at least one of a tint, a color gain, an F number and a shutter speed.

4. An imaging system according to claim 1, wherein the imaging device is a video camera.

5. An imaging system according to claim 1, wherein the imaging device is connected with the control device via a digital interface conforming to IEEE 1394-1995 standard.

6. A control device for controlling an imaging device, the imaging device including a first memory adapted to store a first control parameter for controlling the imaging device, the control device comprising:
    a second memory adapted to store a second control parameter for controlling the imaging device; and
    a controller adapted (i) to change the second control parameter regardless of whether the imaging device is connected with the control device, (ii) to query a user whether to match the first control parameter with the second control parameter if the first control parameter does not match the second control parameter, and (iii) to control the imaging device to match the first control parameter with the second control parameter if the user selects to match the first control parameter with the second control parameter.

7. A control device according to claim 6, further comprising a display adapted to display a value of the second control parameter and an image modified in accordance with the second control parameter.

8. A control device according to claim 6, wherein the first and second control parameters control at least one of a tint, a color gain, an F number and a shutter speed of the imaging device.

9. A control device according to claim 6, wherein the imaging device is a video camera.

10. A control device according to claim 6, wherein the imaging device is connected with the control device via a digital interface conforming to IEEE 1394-1995 standard.

11. A method for controlling an imaging device, the imaging device including a first memory adapted to store a first control parameter for controlling the imaging device, the method comprising the steps of:
    storing a second control parameter for controlling the imaging device in a second memory included in a control device;
    changing the second control parameter regardless of whether the imaging device is connected with the control device;
    querying a user whether to match the first control parameter with the second control parameter if the first control parameter does not match the second control parameter; and
    controlling the imaging device to match the first control parameter with the second control parameter if the user selects to match the first control parameter with the second control parameter.

12. A method according to claim 11, further comprising a step of displaying a value of the second control parameter and an image modified in accordance with the second control parameter.

13. A method according to claim 11, wherein the first and second control parameters control at least one of a tint, a color gain, an F number and a shutter speed.

14. A method according to claim 11, wherein the imaging device is a video camera.

15. A method according to claim 11, further comprising the step of connecting the imaging device with the control device via a digital interface conforming to IEEE 1394-1995 standard.

* * * * *

UNITED STATES PATENT AND TRADEMARK OFFICE
CERTIFICATE OF CORRECTION

Figure 20:
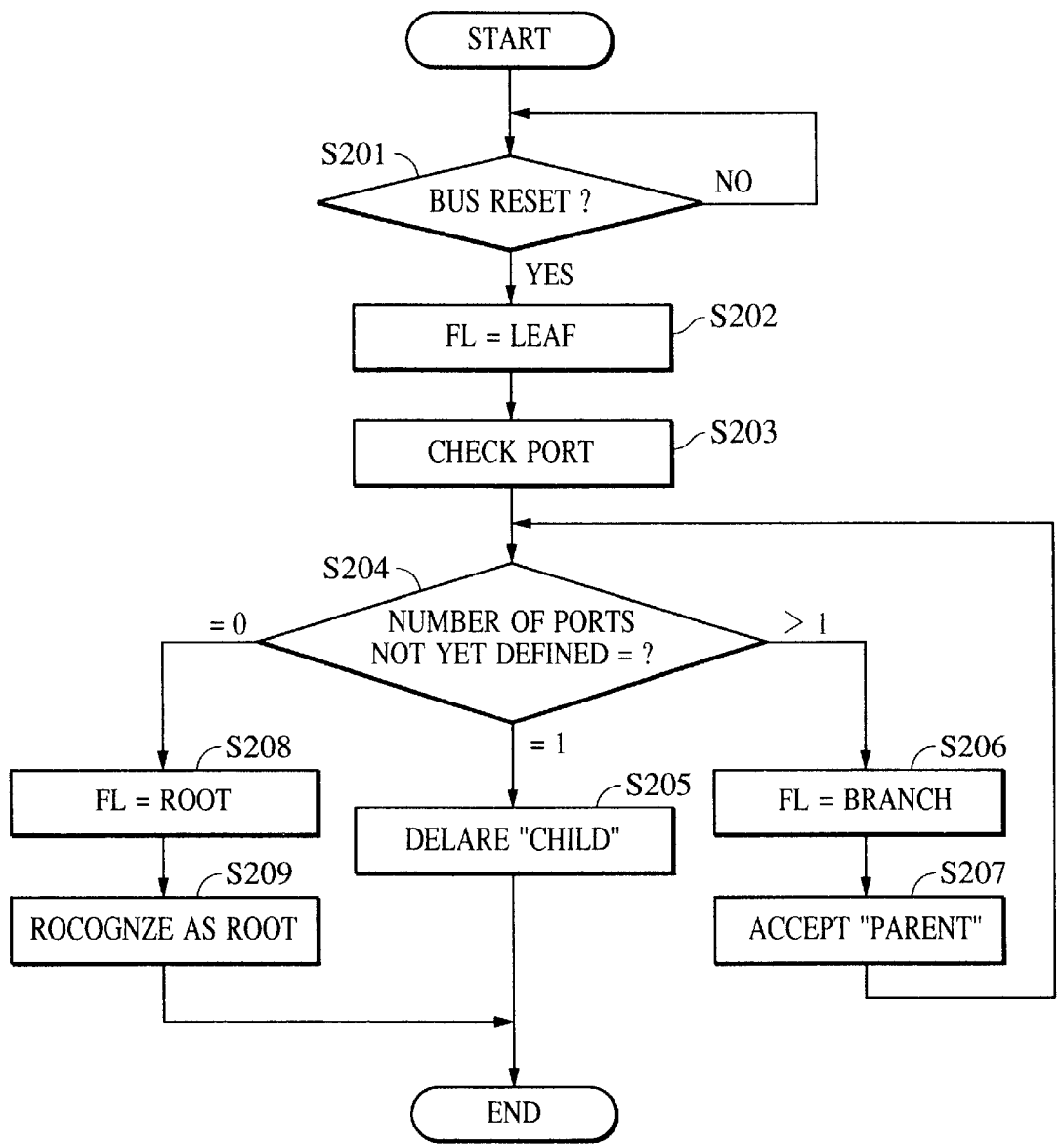
FIG. 20 is a flowchart showing a general sequence 2 from a bus reset to a decision of node IDs (in conformity with IEEE 1394).
Figure 21:
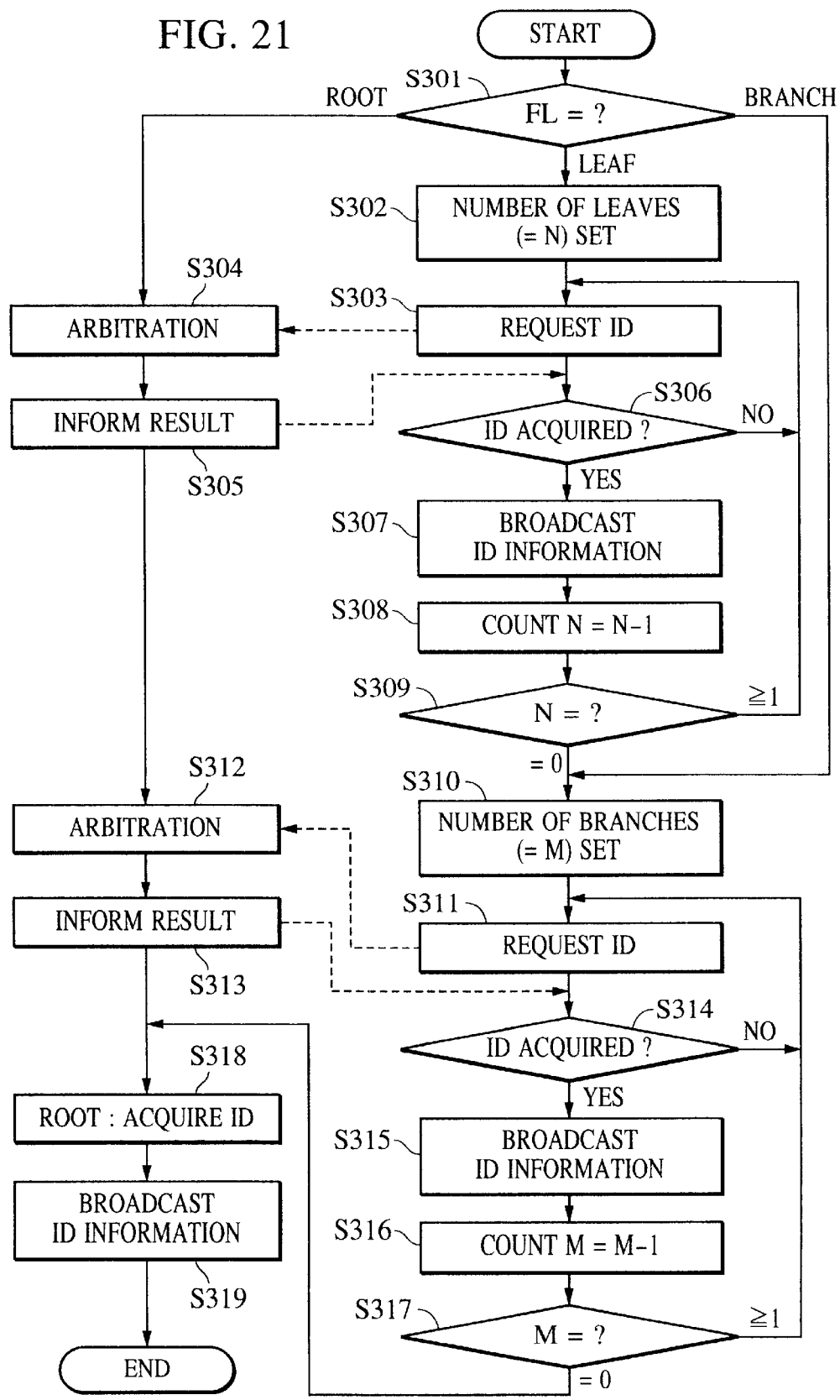
FIG. 21 is a flowchart showing a general sequence from a bus reset to a decision of node IDs (in conformity with IEEE 1394).
Figure 22:
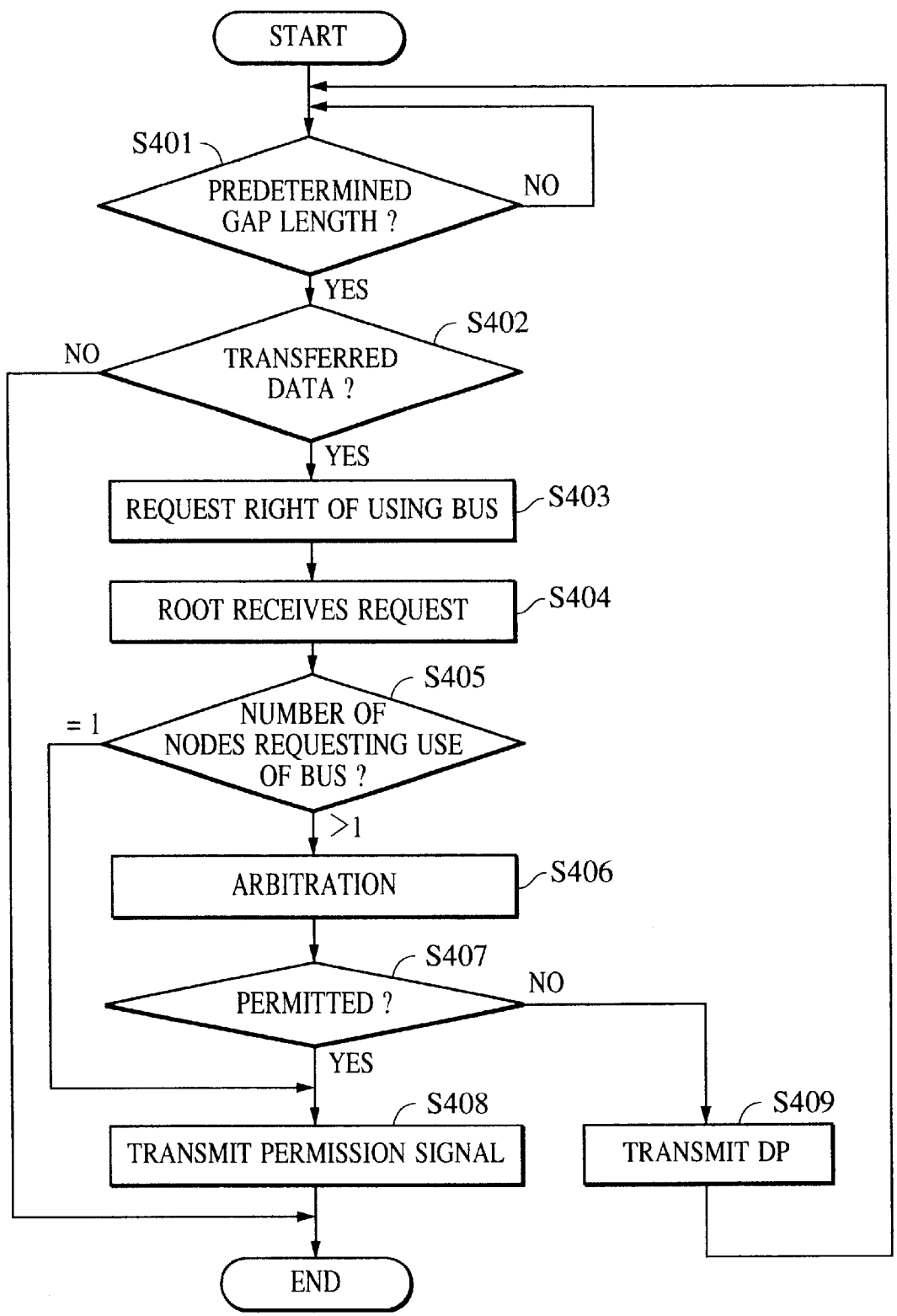
FIG. 22 is a flowchart showing a sequence of an arbitration process(in conformity with IEEE 1394).

PATENT NO. : 6,498,598 B2 Page 1 of 1
DATED : December 24, 2002
INVENTOR(S) : Yoshiyuki Watanabe It is certified that error appears in the above-identified patent and that said Letters Patent is hereby corrected as shown below:

Drawings,
Sheet 19, Fig 20, "ROCOGNZE" should read -- RECOGNIZE --, and "DELARE" should read -- DECLARE --.
Sheet 27, Fig 28, "FOCUSSING" ($3^{rd}$ occurrence) should read -- FOCUSING --.

Column 1,
Line 49, "connecting," should read -- connecting --.

Column 9,
Line 23, "the" ($3^{rd}$ occurrence) shoud be deleted.
Line 41, "requests" should read -- requests for --.

Column 27,
Line 51, "Tough" should read -- Though --.

Column 28,
Line 16, "is" should read -- are --.

Signed and Sealed this

Fifteenth Day of July, 2003

JAMES E. ROGAN
*Director of the United States Patent and Trademark Office*